(12) United States Patent
Taylor et al.

(10) Patent No.: US 7,528,597 B2
(45) Date of Patent: May 5, 2009

(54) INDUCTION SENSOR

(75) Inventors: G. Brandt Taylor, Berlin, MA (US); Steven E. Beard, Berlin, MA (US)

(73) Assignee: Digisensors, Inc., Berlin, MA (US)

( * ) Notice: Subject to any disclaimer, the term of this patent is extended or adjusted under 35 U.S.C. 154(b) by 119 days.

(21) Appl. No.: 10/592,026

(22) PCT Filed: Mar. 7, 2005

(86) PCT No.: PCT/US2005/007363

§ 371 (c)(1),
(2), (4) Date: Jul. 2, 2007

(87) PCT Pub. No.: WO2005/086767

PCT Pub. Date: Sep. 22, 2005

(65) Prior Publication Data

US 2007/0279138 A1    Dec. 6, 2007

Related U.S. Application Data

(63) Continuation-in-part of application No. 11/074,370, filed on Mar. 7, 2005, now abandoned.

(60) Provisional application No. 60/641,225, filed on Jan. 4, 2005, provisional application No. 60/605,943, filed on Aug. 31, 2004, provisional application No. 60/578, 548, filed on Jun. 10, 2004, provisional application No. 60/574,414, filed on May 26, 2004, provisional application No. 60/566,112, filed on Apr. 28, 2004, provisional application No. 60/551,199, filed on Mar. 8, 2004.

(51) Int. Cl.
*G01B 7/14*     (2006.01)
*G01B 7/30*     (2006.01)
*H03B 1/00*     (2006.01)
*H03B 5/00*     (2006.01)

(52) U.S. Cl. .............................. 324/207.15; 324/207.25; 331/36 R; 331/65

(58) Field of Classification Search ............ 324/207.15, 324/207.18, 207.25–207.26, 239; 331/1 R, 331/36 R, 36 C, 36 L, 65–66, 167; 336/10, 336/30; 73/862.626, 718, 724
See application file for complete search history.

(56) References Cited

U.S. PATENT DOCUMENTS

| | | | |
|---|---|---|---|
| 2,452,156 A | 10/1948 | Schover | 177/351 |
| 3,350,660 A | 10/1967 | Engdahl et al. | 331/65 |
| 3,397,364 A | 8/1968 | Crandall | 331/65 |
| 3,461,400 A | 8/1969 | Koda | 331/65 |
| 3,521,158 A | 7/1970 | Morrow et al. | 324/34 |
| 3,609,580 A | 9/1971 | Thompson et al. | 331/65 |
| 3,619,805 A | 11/1971 | Bean | 331/65 |
| 3,701,041 A | 10/1972 | Adler et al. | 331/65 |
| 3,732,503 A | 5/1973 | Rapp et al. | 331/65 |
| 3,735,244 A | 5/1973 | Gumtau et al. | 323/51 |
| 3,756,081 A | 9/1973 | Young | 73/336.5 |
| 3,760,392 A | 9/1973 | Stich | 340/200 |
| 3,818,369 A | 6/1974 | Brocker | 331/65 |
| 3,891,918 A | 6/1975 | Ellis | 324/34 D |

(Continued)

*Primary Examiner*—Bot LeDynh
(74) *Attorney, Agent, or Firm*—Burns & Levinson LLP; Jacob N. Erlich; Orlando Lopez

(57) ABSTRACT

Position sensor circuits are disclosed for use with variable reluctance sensors. Variable reluctance sensors are described for linear, angular and rotary position measurement and for acceleration measurement.

31 Claims, 31 Drawing Sheets

U.S. PATENT DOCUMENTS

| | | | |
|---|---|---|---|
| 4,068,189 A | 1/1978 | Wilson | 331/65 |
| 4,284,961 A | 8/1981 | Landau | 331/65 |
| 4,310,807 A | 1/1982 | McKee | 331/65 |
| 4,618,835 A | 10/1986 | Wilson | 331/65 |
| 4,663,542 A | 5/1987 | Buck et al. | 327/517 |
| 4,809,742 A | 3/1989 | Grau | 137/554 |
| 5,079,502 A | 1/1992 | Rogacki et al. | 324/207.19 |
| 5,142,226 A | 8/1992 | Sakamoto et al. | 324/207.24 |
| 5,172,298 A | 12/1992 | Shimizu et al. | 361/152 |
| 5,767,672 A | 6/1998 | Guichard et al. | 324/236 |
| 6,215,365 B1 | 4/2001 | Kurkovskiy | 331/65 |
| 6,335,619 B1 | 1/2002 | Schwab et al. | 324/207.26 |
| 6,532,834 B1 | 3/2003 | Pinto et al. | 73/862.626 |
| 6,639,759 B2 | 10/2003 | Inoguchi et al. | 360/261.1 |
| 6,731,119 B2 | 5/2004 | Haffner et al. | 324/635 |
| 7,046,018 B2 | 5/2006 | Toda et al. | 324/679 |
| 2004/0056748 A1 | 3/2004 | Masaki et al. | 336/119 | section AA

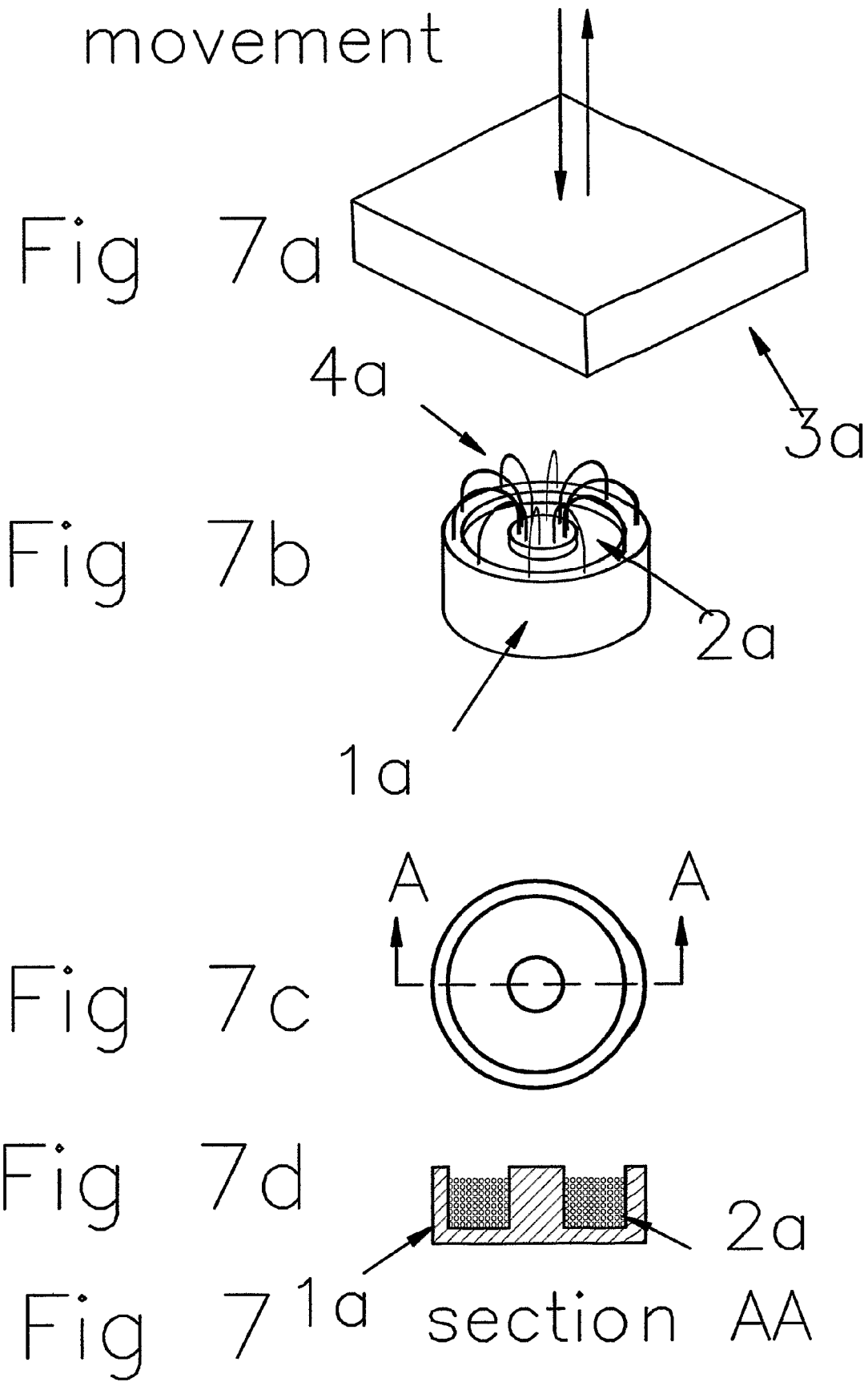

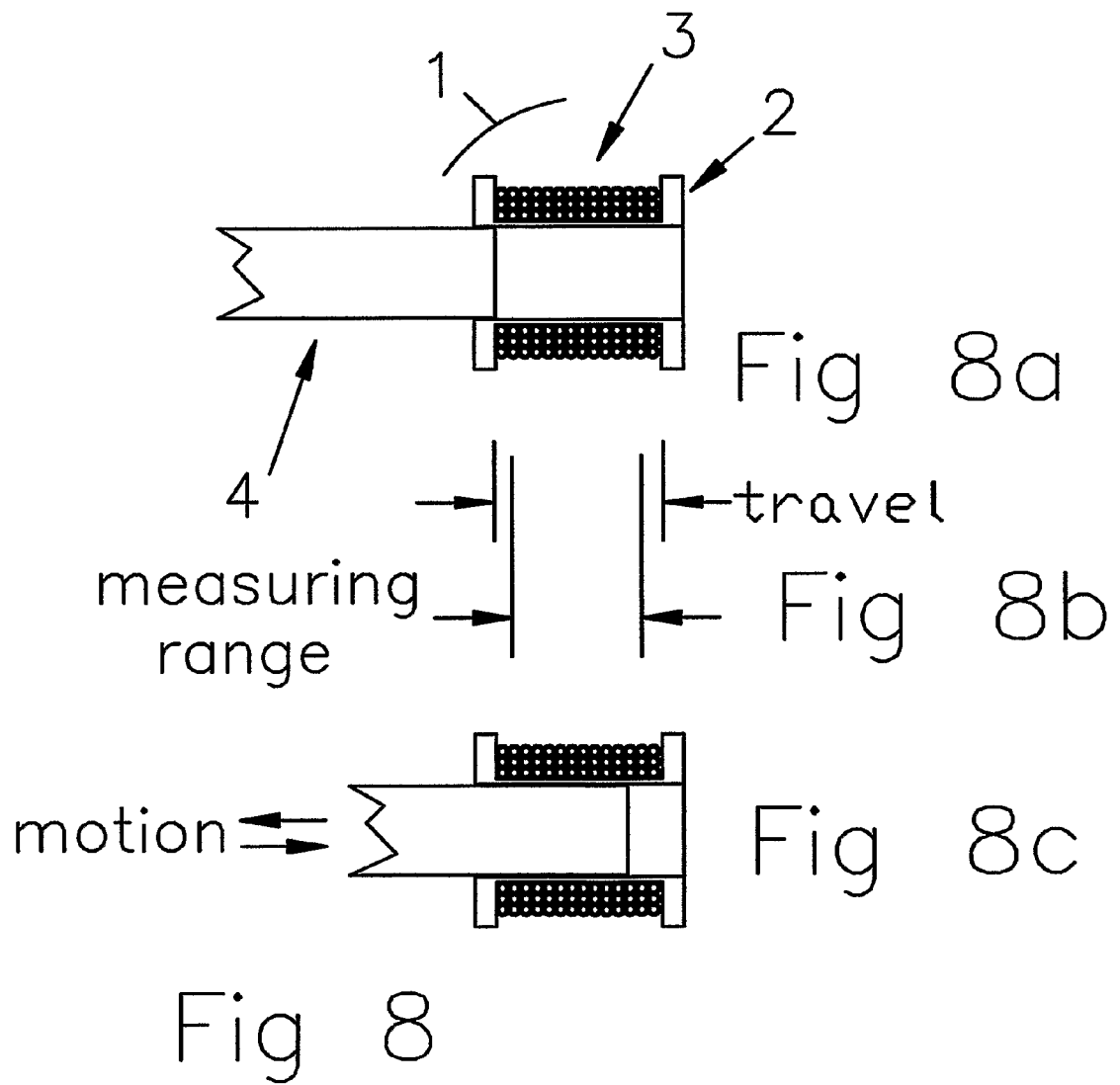

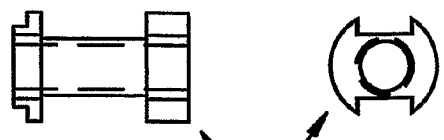
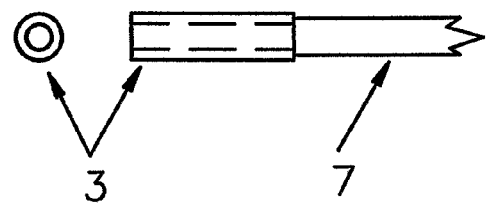
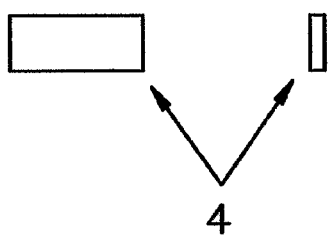
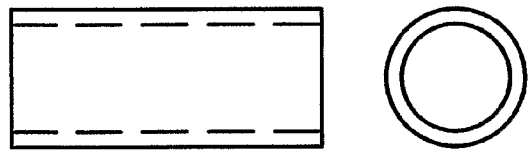
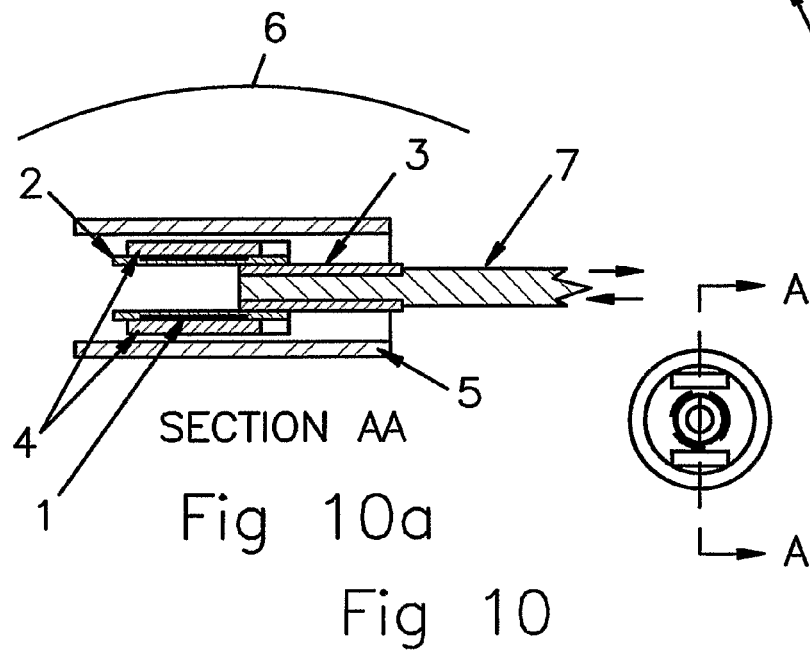
Fig 10 rotation

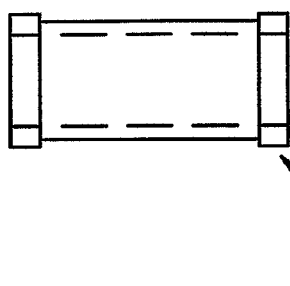
Fig 14a
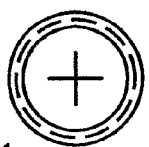
Fig 14b
2
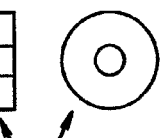
Fig 14c   Fig 14d
3
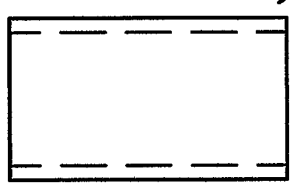
Fig 14e
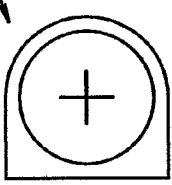
Fig 14f
4
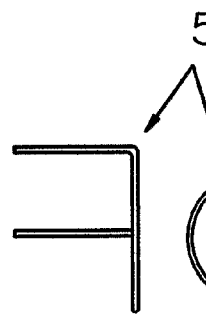
Fig 14g   Fig 14h
5
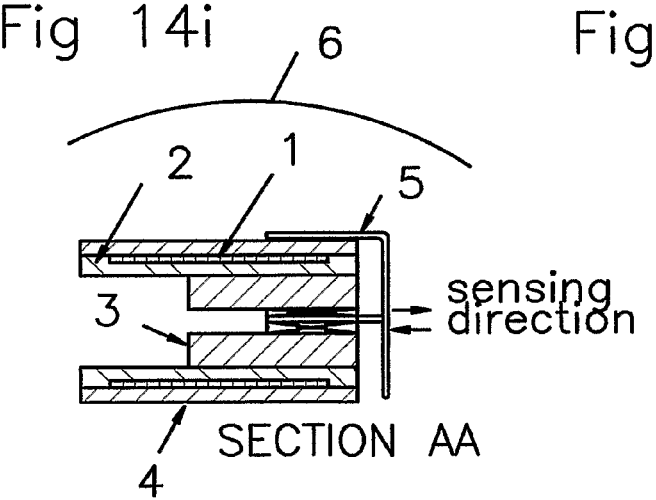
Fig 14i
SECTION AA
sensing direction
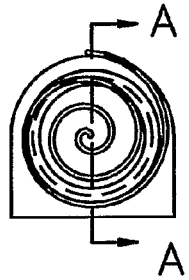
Fig 14j
Fig 14

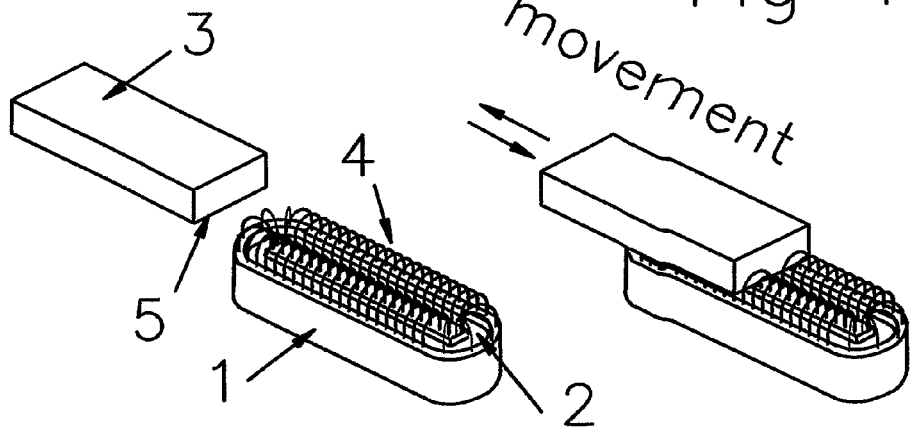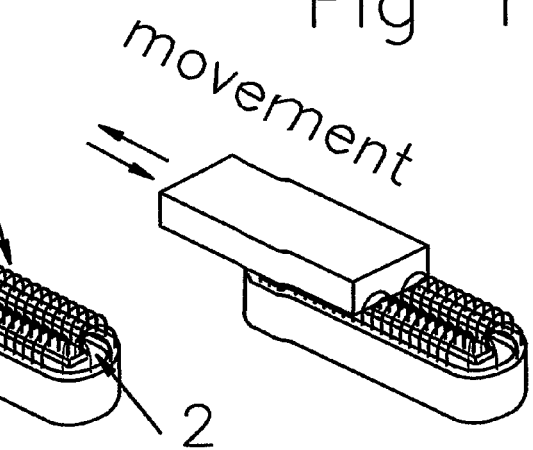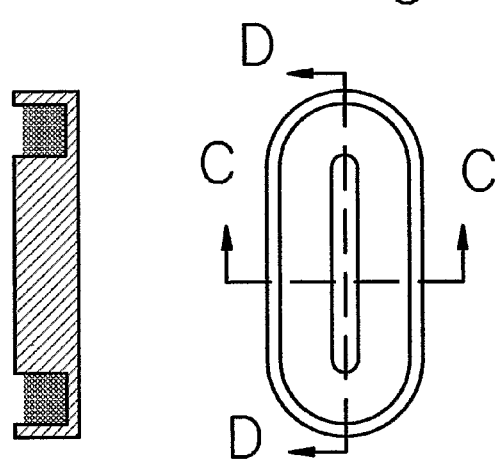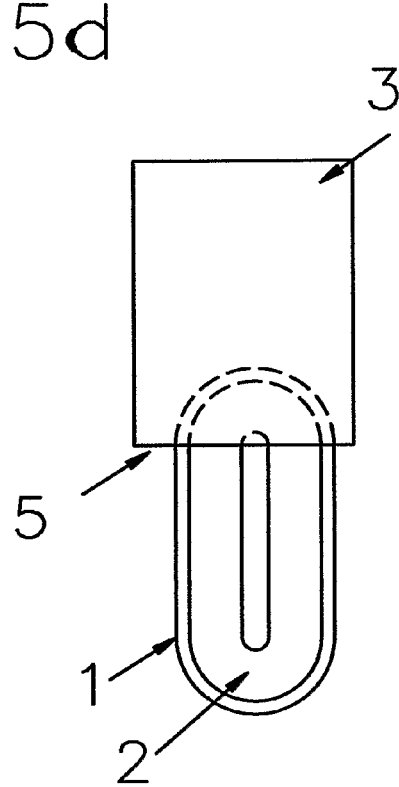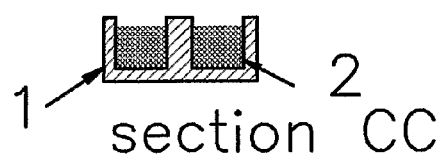
Fig 15

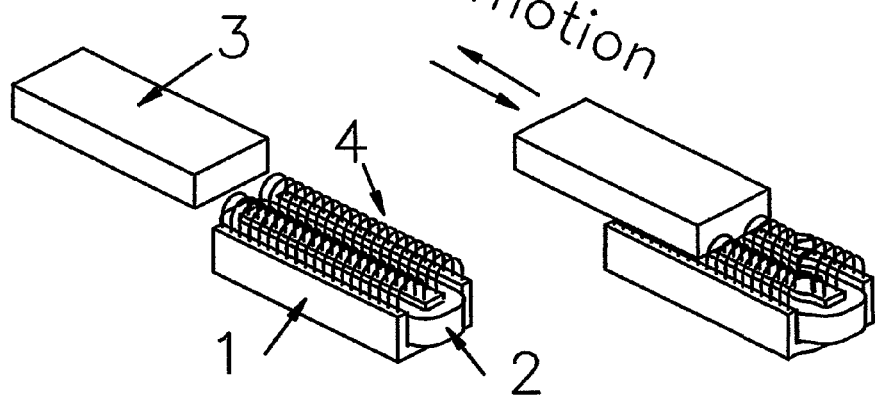
Fig 16a  Fig 16b
actuator at position 1 in Fig 31
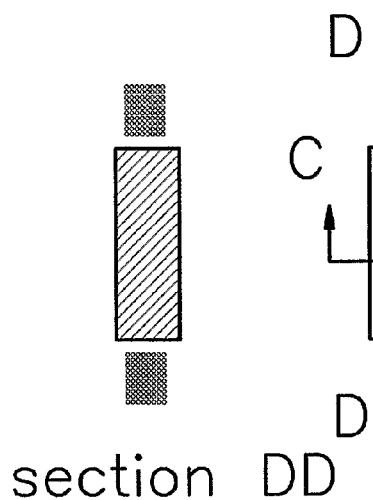 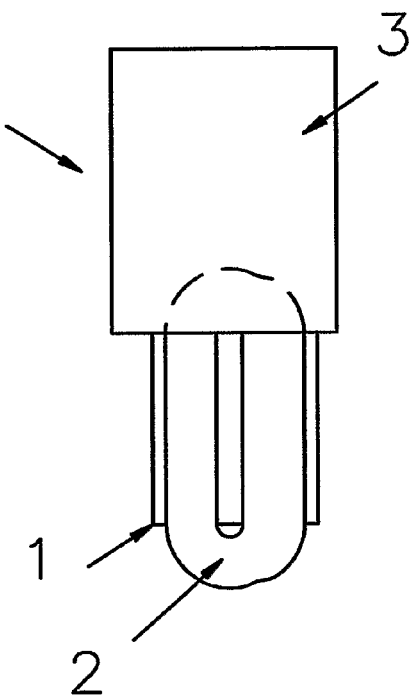
Fig 16c  Fig 16d  Fig 16e
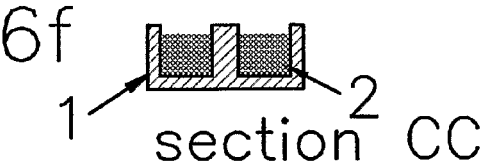
Fig 16f  Fig 16

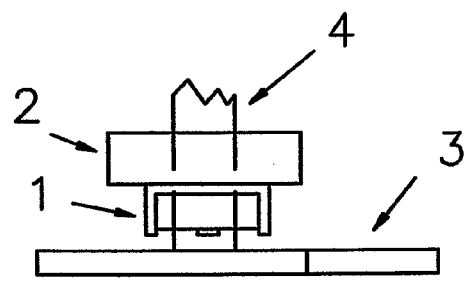
Fig 17a
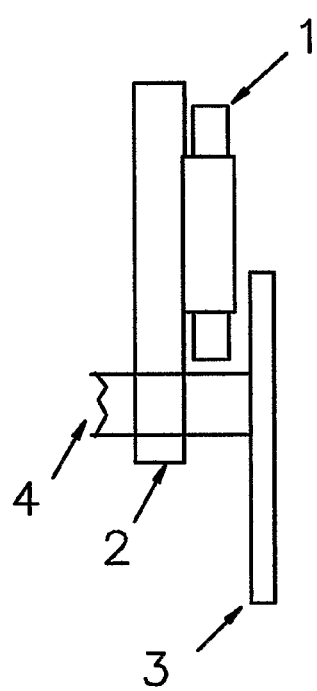
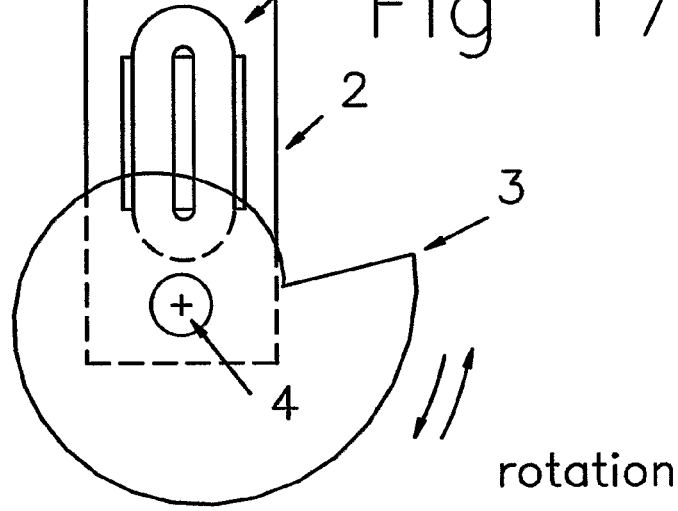
Fig 17b
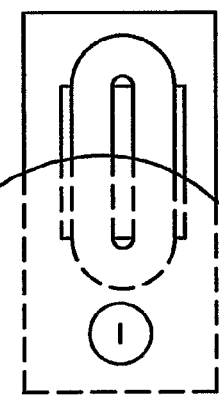
Fig 17c
Fig 17d
Fig 17

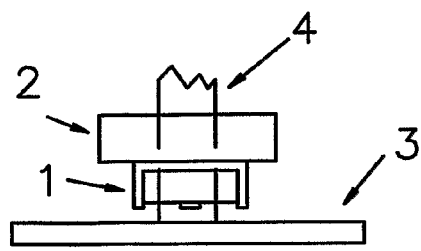
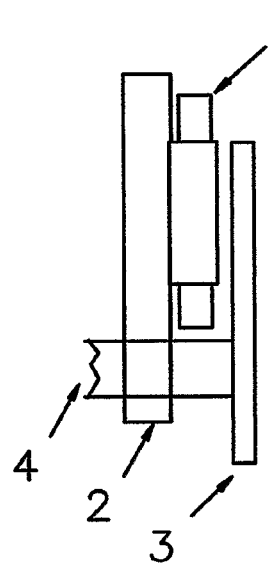
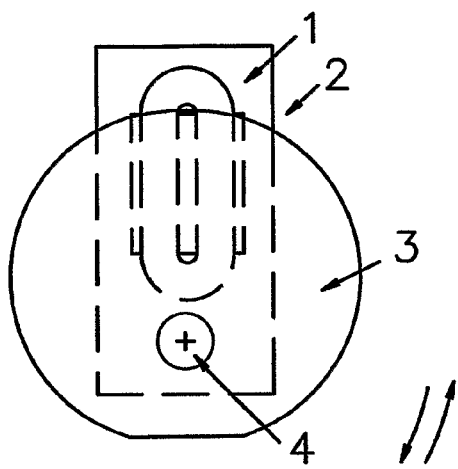
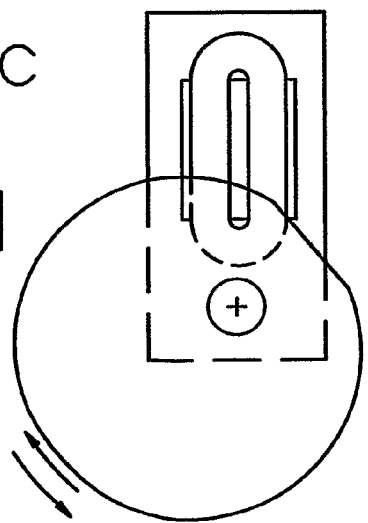
Fig 18

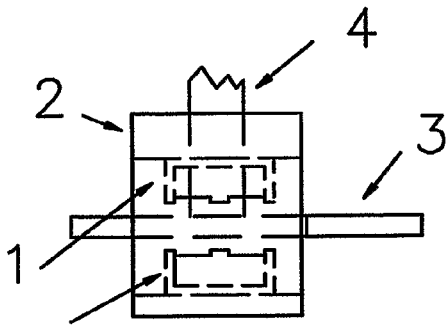
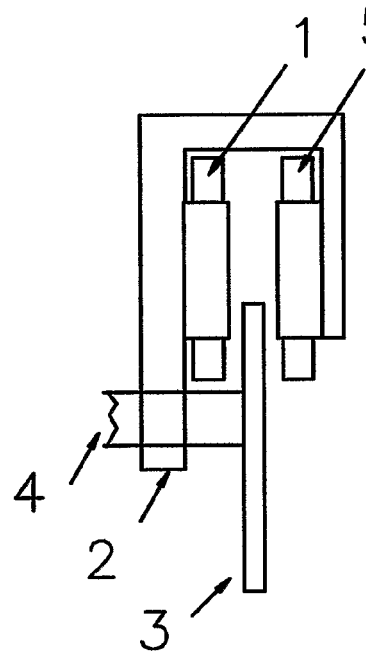
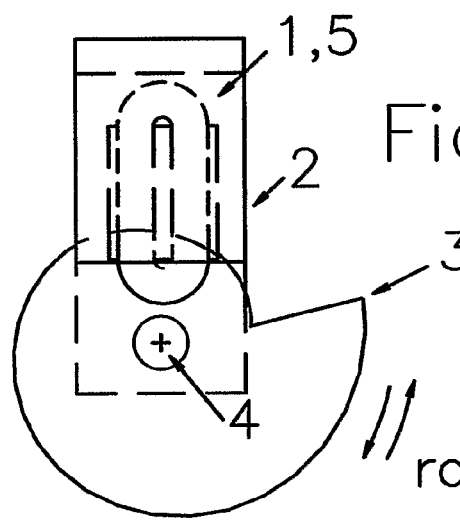
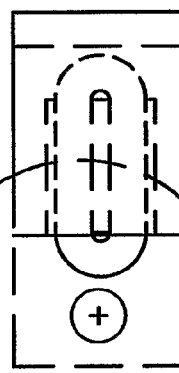
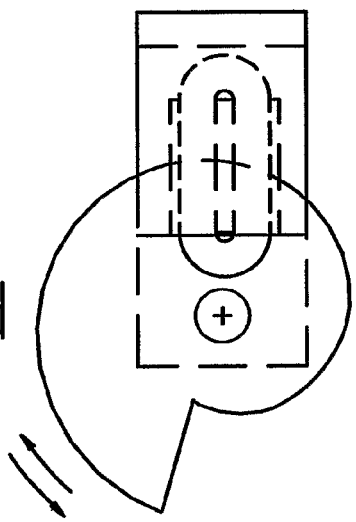
Fig 19a
Fig 19b
Fig 19c
Fig 19d
Fig 19

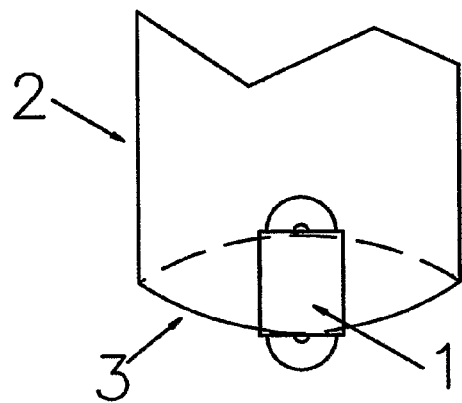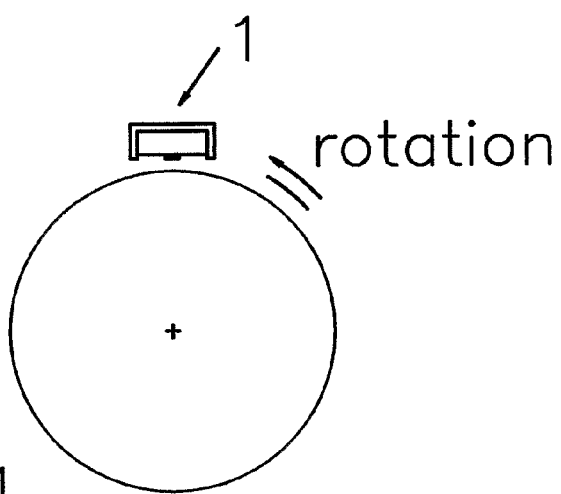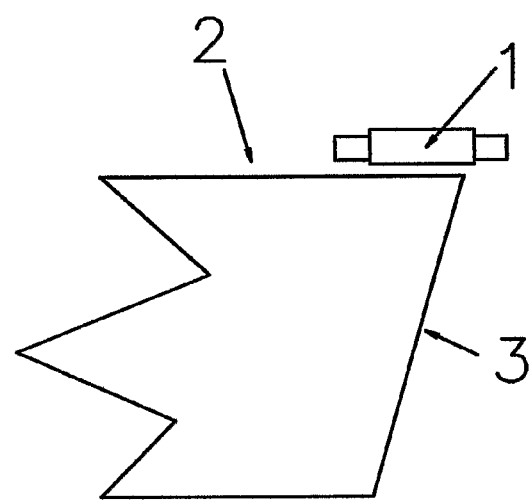
Fig 22a
Fig 22b
Fig 22c
Fig 22

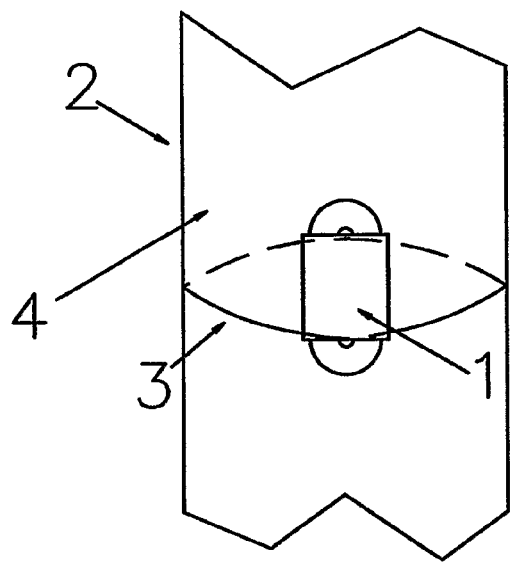
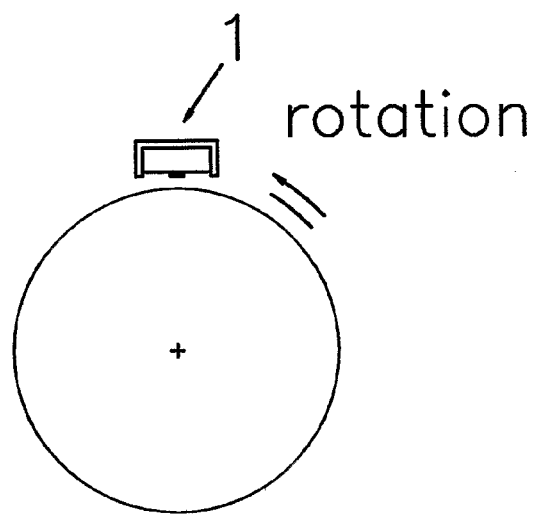
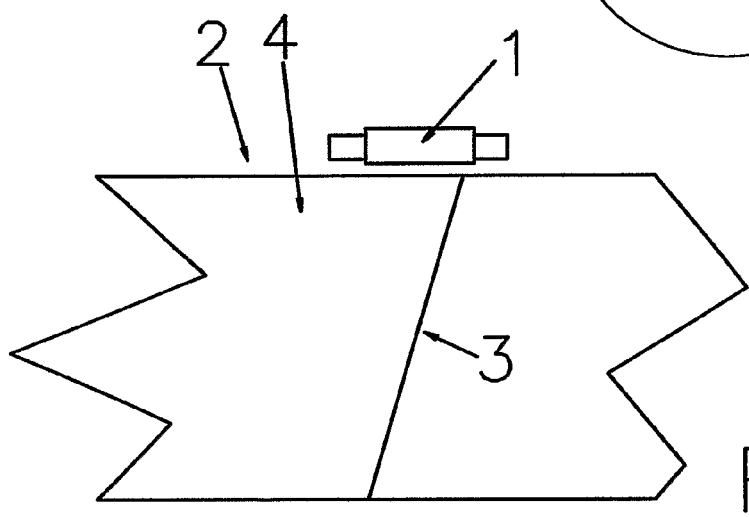
Fig 23

INDUCTION SENSOR

CROSS-REFERENCE TO RELATED APPLICATIONS

This application is a national stage filing under 35 U.S.C. 371 of International Application No. PCT/US05/07363, filed Mar. 07, 2005, which claims the benefit under 35 U.S.C. §119(e) of U.S. Provisional Application No. 60/551,199 filed Mar. 8, 2004, U.S. Provisional Application No. 60/566,112 filed Apr. 28, 2004, U.S. Provisional Application No. 60/574,414 filed May 26, 2004, U.S. Provisional Application No. 60/578,548 filed Jun. 10, 2004, U.S. Provisional Application No. 60/605,943 filed Aug. 31, 2004, and U.S. Provisional Application No. 641,225 filed Jan. 4, 2005, all of which are hereby incorporated by reference. And this application is a continuation-in-part of U.S. patent application Ser. No. 11/074,370, filed Mar. 07, 2005, now abandoned, the content of which is hereby incorporated by reference in its entirety.

STATEMENT REGARDING FEDERALLY SPONSORED RESEARCH OR DEVELOPMENT

This invention has been created without the sponsorship or finding of any federally sponsored research or development program.

BACKGROUND OF THE INVENTION

Position sensors that work by using the variable reluctance of an electromagnetic field about an inductor have been known for many years. With these devices relative motion between an actuator and an inductor (coil) causes a change in the reactance of the coil and that change is used to cause an associated circuit to have a change in electrical output. With the prior art the most common circuit has generally consisted of three functional groups. See FIG. 1. Those functional groups are an oscillator, a reactive unit, and an amplifier. Alternating current produced by the oscillator is fed to the reactive unit. The reactive unit consists of coil 2 in parallel with capacitor 4. Actuator 3 moves in relation to coil 2 and causes the reactance of coil 2 to change. Coil 2 and actuator 3 make up variable inductor 1. Voltage drop across the reactive unit is amplified for output. A change in reactance caused by a change in position of the actuator relative to the inductor causes a change in output of the amplifier. In this way the relative position of the inductor and actuator is determined. There have been variations on the arrangement of the above three functional groups, but in most cases the principle used has been that an oscillating current fed to an inductor has a voltage drop across the inductor, and if the voltage drop changes that change can be measured. With the prior art sensor arrangement the inductor 2 is connected directly to ground. Voltage across the inductor equals the resistance of the inductor times the current through the inductor. Since the electrical resistance of variable inductors used for variable reluctance position measuring devices is small and since the current through the reactive unit must be small the voltage drop across the reactive unit must be small. Thus with the prior art the voltage differential of the reactive unit is small. Because the voltage differential is small, the resolution of measurement is small and also effected by electromagnetic noise and stray capacitance in the circuit and environment. The cause of the low voltage differential with prior art variable reluctance sensors is the result of the circuit used and also the physical characteristics of the sensors employed.

Another type of prior art circuit uses two oscillators. One oscillator of fixed frequency and one oscillator that includes the sensor coil in a tank circuit where the coil and a capacitor are wired in parallel. The frequency of the tank circuit changes with change in inductance and the difference between the frequency of the fixed oscillator and the variable oscillator are compared. These circuits add much complexity for little improvement in performance and are seldom used.

The prior art induction sensors can be divided into two types. One type, as in FIG. 6, uses a coil 2 with a space inside of it in which an actuator 3 resides. Prior art sensors of this type suffer from the fact that the output is not linear with regard to position.

Another sensor type of the prior art is the proximity device shown in FIG. 7. Here coil 2 is enclosed in a ferrite housing 1 that covers the outside diameter of the coil and also one end of the coil. A section of ferrite also fills the space inside of the coil and is in contact with the ferrite that encloses one end of the coil. In the art this ferrite shape is called a pot core. By means of the pot core, the electromagnetic field 4 produced by the oscillating current in the coil is projected from the ferrite on the end of the coil that is not enclosed by the ferrite. This type of sensor is used for detecting the position of an object 3 as that object moves in a direction parallel to the axis of the coil, and toward or away from the open end of the ferrite housing. That object is the actuator. This type of device may also be used to simply detect the presence or absence of the actuator in the field.

All of the prior art devices experienced various deficiencies in terms of accuracy, functionality, reliability, and cost.

These and other difficulties experienced with the prior art devices have been obviated in a novel manner by the present invention.

It is one purpose of this invention to provide a sensor circuit that can provide better resolution than the prior art.

It is also a purpose of this invention to provide sensors that when used with the sensor circuit of the present invention provide better resolution than the prior art.

It is also a purpose of this invention to provide sensor systems in which the effect of electromagnetic noise and stray capacitance is diminished.

It is another object of this invention to provide a device of the type show in FIG. 6 that has linear output with regard to position.

It is another object of this invention to provide a sensor of the type show in FIG. 6 that is capable of detecting angular position.

It is another object of this invention to provide a variable reluctance sensor for measuring acceleration It is another object of this invention to provide a device of the type show in FIG. 7 that detects motion of an actuator across the face of the sensor, in a direction perpendicular to the axis of the coil. This device is suitable for detecting linear position of the actuator and is here called a modified pot core sensor.

It is another object of this invention to provide an arrangement for the use of the modified pot core sensor in conjunction with a rotatable shaft where radial position of the shaft can be detected.

It is a further object of the invention to provide a sensor that is capable of being manufactured of high quality and at a low cost, and which is capable of providing a long and useful life with a minimum of maintenance.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

A variable inductor is incorporated into an oscillator circuit. The change in the frequency or amplitude of the oscillation with change in the reactance of the inductor is taken as output. Various circuits are described for using the output of the oscillator.

Various sensors that work on the variable reluctance principle are described. Also, sensor actuator and sensor coil shapes are described that give improved performance.

For linear position detection, a sensor coil winding technique is described that gives improved linearity of output. Also for linear position detection, a sensor actuator shape and coil actuator relationship is described that gives improved linearity of output. The material used for actuator construction is delineated.

A variable reluctance sensor for acceleration measurement is disclosed.

A variable reluctance sensor for angular position measurement is disclosed.

A proximity sensor for detecting linear position is disclosed. Arrangements are described for using this proximity sensor for determining radial position of a shaft that can rotate.

BRIEF DESCRIPTION OF THE DRAWINGS

The character of the invention, however, may best be understood by reference to one of its structural forms, as illustrated by the accompanying drawings, in which:

FIG. 7 (7a-d) shows a pot core sensor of the prior art.

FIG. 8 (8a-c) shows a coil wound according to the prior art.

FIG. 10 (10a-j) shows a linear position sensor with high resolution.

FIG. 14 (14a-j) shows a sensor embodiment for detecting force of acceleration.

FIG. 15 (15a-f) shows a sensor with a for detecting motion external to the sensor.

FIG. 16 (16a-f) shows a modification of the sensor of FIG. 13.

FIG. 17 (17a-d) shows a sensor arrangement for radial position detection.

FIG. 18 (18a-d) shows an alternate to the sensor of FIG. 17

FIG. 19 (19a-d) shows a radial sensor arrangement that compensates for axial runout.

FIG. 22 (22a-c) shows another sensor arrangement for detecting radial position.

FIG. 23 (23a-c) shows a variation of FIG. 22.

DETAILED DESCRIPTION OF THE INVENTION

Figure 2:
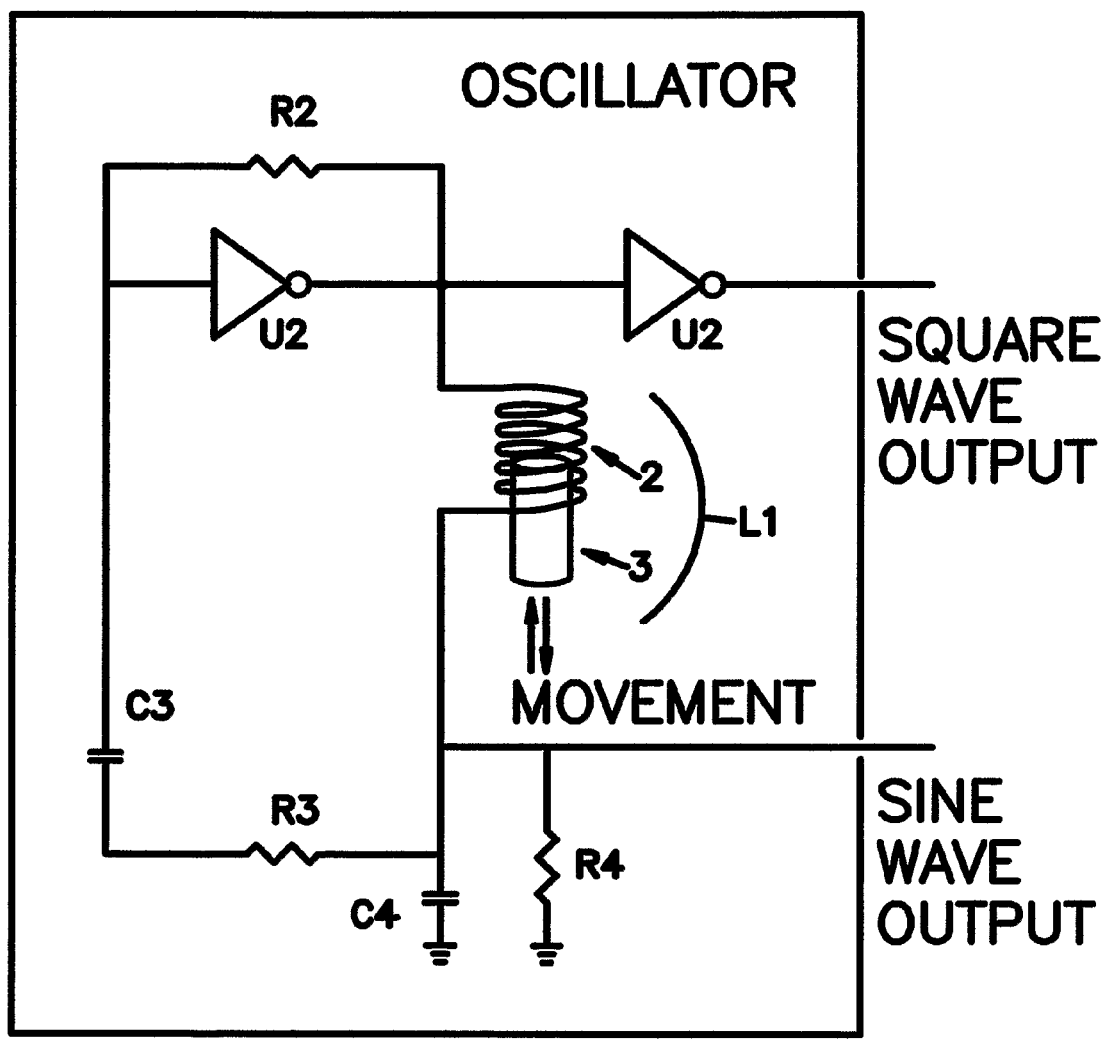
FIG. 2 is a schematic of the basic circuit employed in this invention.

FIG. 2 shows the basic circuit of the present invention. The circuit is a tuned oscillator circuit. The tuned oscillator circuit is comprised of an amplifier (U2) and two reactive components, an inductor L1 and a capacitor C4. L1 and C4 are in series connection with C4 connected to ground (return) and L1 connected to the output of the amplifier U2. The frequency of the oscillator is:

$$F = \frac{1}{2\pi\sqrt{LC}}$$

The amplifier U2 shown in FIG. 2 is a high speed CMOS hex inverter. The resistor R2 is used to bias the input of the amplifier to compensate for the leakage current. The resistor R3 and capacitor C3 provide the feedback path. The oscillator is AC coupled by capacitor C3 so that there is no DC voltage path through the oscillator. A transistor amplifier or operational amp will also work in place of hex inverter U2. The inductor L1 is the coil in the sensors disclosed in this paper. Two signals can be generated from the oscillator for use as output. One signal is a square wave the other is a sine wave, both have the same frequency. The signal from U2 to L1 is a square wave. This can be taken as output. If U2 is a hex inverter, the signal from one section of amplifier U2 that drives the inductor L1 can be passed to another section of the amplifier and the output of the second section used as output. This is shown in FIG. 2. This signal is a square wave. The square wave is preferable for some applications like input to a counter or microprocessor. Alternately, the signal at the connection between the inductor L1 and capacitor C4 is a sine wave and that sine wave can be taken as output. Examples of applications that require sine wave input are where V(RMS) or isolated input are needed. Also, the sine wave can be rectified to a DC voltage signal.

In the circuit of FIG. 2 the inductor L1 is separated from ground by capacitor C4 and resistor R4. This does two beneficial things. First, the inductor is isolated from noise on the ground buss that causes a improvement in the common mode rejection ratio (CMRR). An improvement in the CMRR improves resolution of the sensor output since noise input to the circuit is isolated from the output. Second, with the inductor L1 in series with capacitor C4 charge stored in the inductor can cause a voltage increase when the amplifier switches state.

Figure 1:
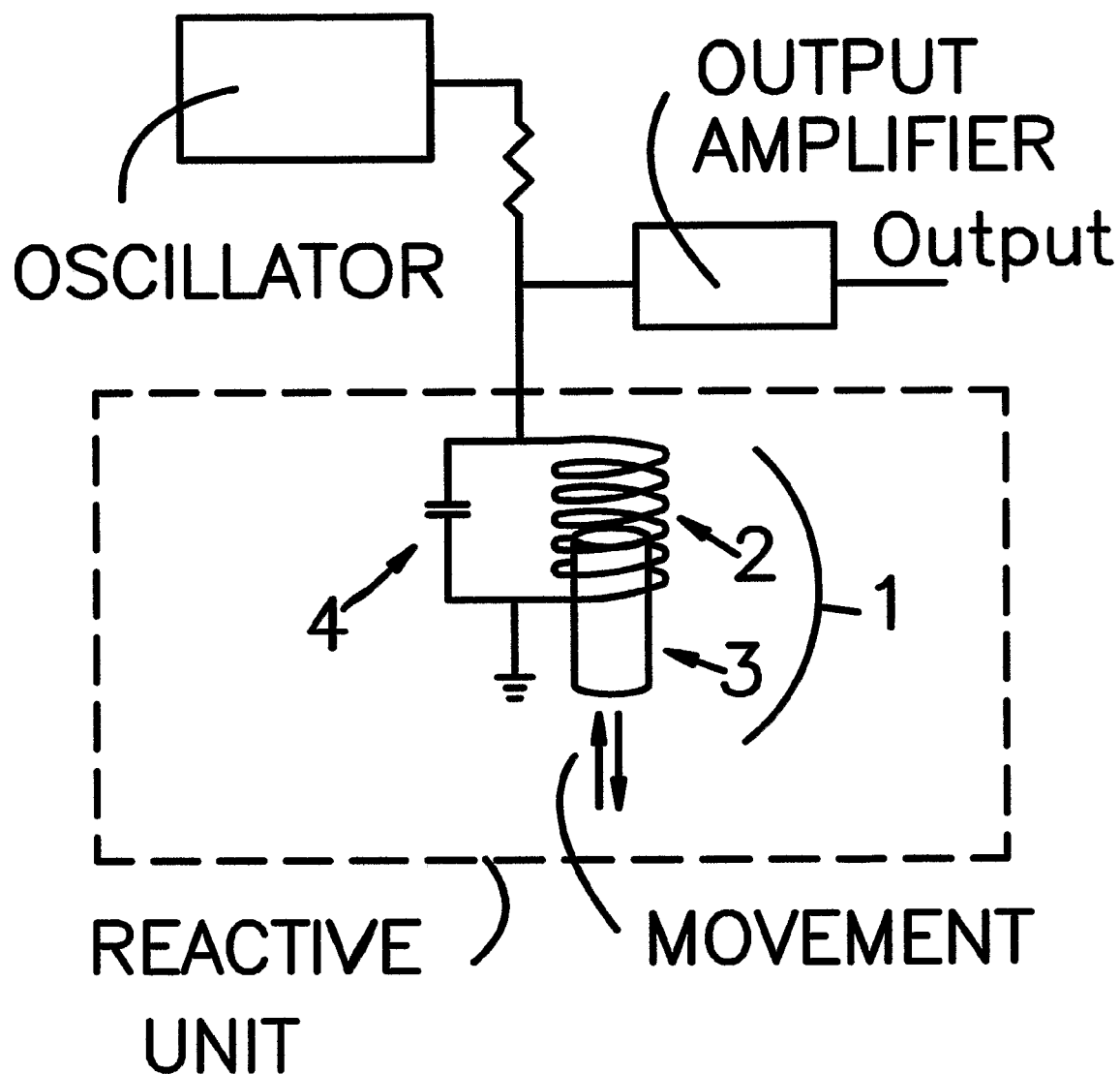
FIG. 1 is a block diagram of a sensor circuit used with prior art induction position sensors

Thus voltage differential of the circuit with change in inductor reluctance is much greater than with the circuit of FIG. 1 or with tank circuits used in two oscillator sensor circuits.

Since the circuit of FIG. 2 is an oscillator in which the frequency and voltage of the oscillation (sine wave) is dependent on the inductor and there is a feedback path to the oscillator's amplifier the relation of change in reactance of the inductor to output can be greater than with the prior art.

Figure 3:
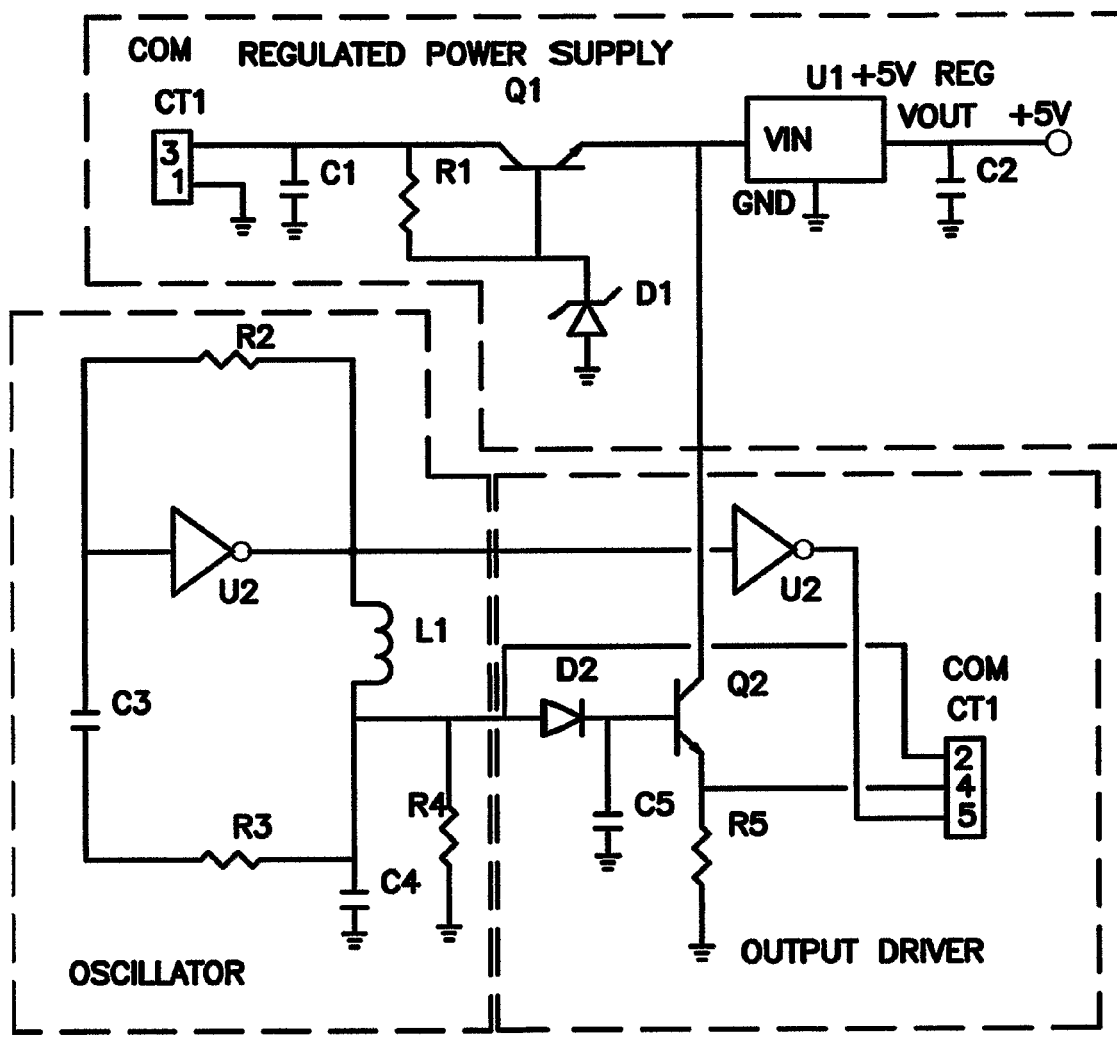
FIG. 3 is a schematic of a circuit that has frequency and voltage output.

FIG. 3 shows a complete position sensor circuit. The circuit has three functional blocks, a regulated power supply, a tuned oscillator circuit, and an output driver. The function of the regulated power supply is to allow the device to work on an input voltage of 8-50 VDC. The positive voltage is applied to pin 3 of connector CT1 and ground (return) is applied to pin 1. An on board regulated +5 VDC supply (U1) is used to power the oscillator functional block. This voltage regulator has a maximum input voltage of +16 VDC. The transistor Q1 with the base voltage limited to 15 VDC via the Zener diode D1, keeps the input voltage to U1 below the maximum tolerance. The tuned oscillator circuit is the circuit of FIG. 2. There are three output values of the circuit, a sine wave, a DC voltage, and a square wave. The sine wave is frequency output at CT1 pin 2. The DC voltage value is at CT1 pin 4. And the square wave is at CT1 pin 5. The diode D2 and capacitor C5 rectify the sine wave output to a DC voltage value. The transistor Q2 is used to add some drive current to the DC voltage output signal. The inductor L1 is the coil in the sensors described here.

Figure 26:
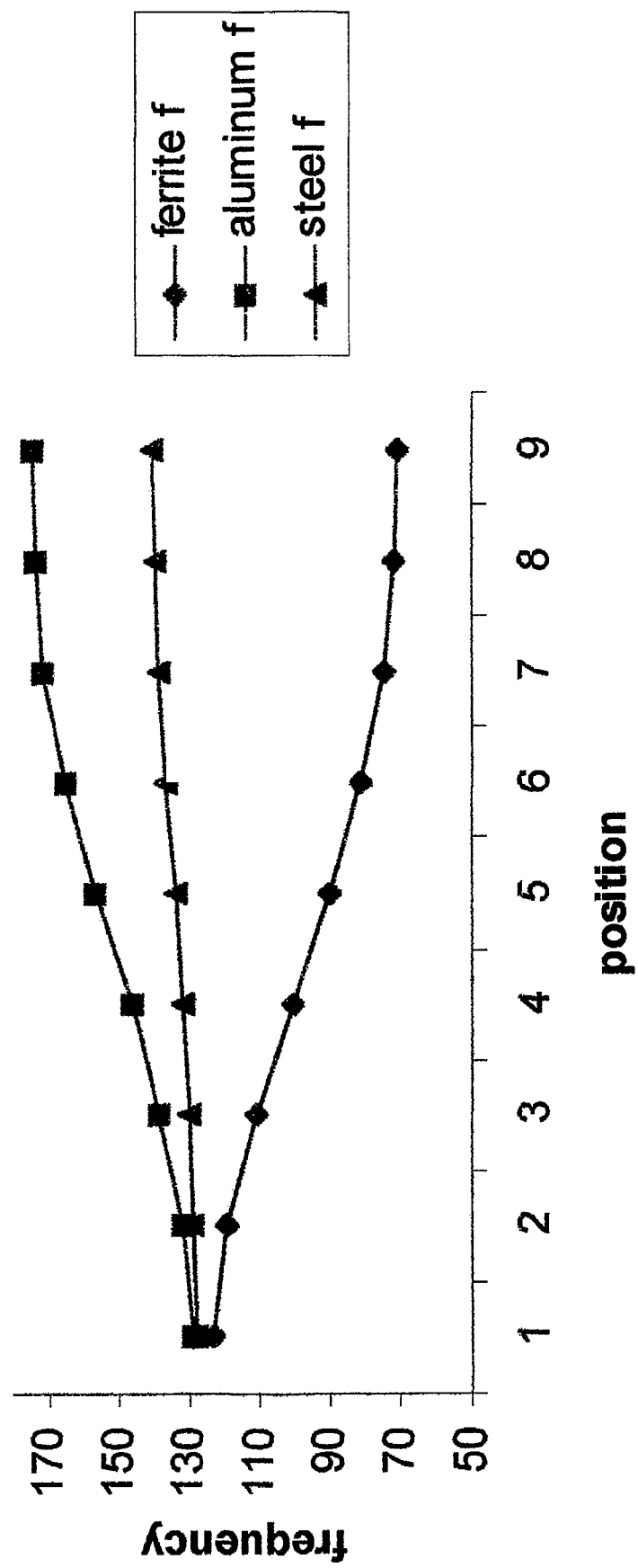
FIG. 26 is a graph of frequency vs. position for different actuator material.
Figure 27:
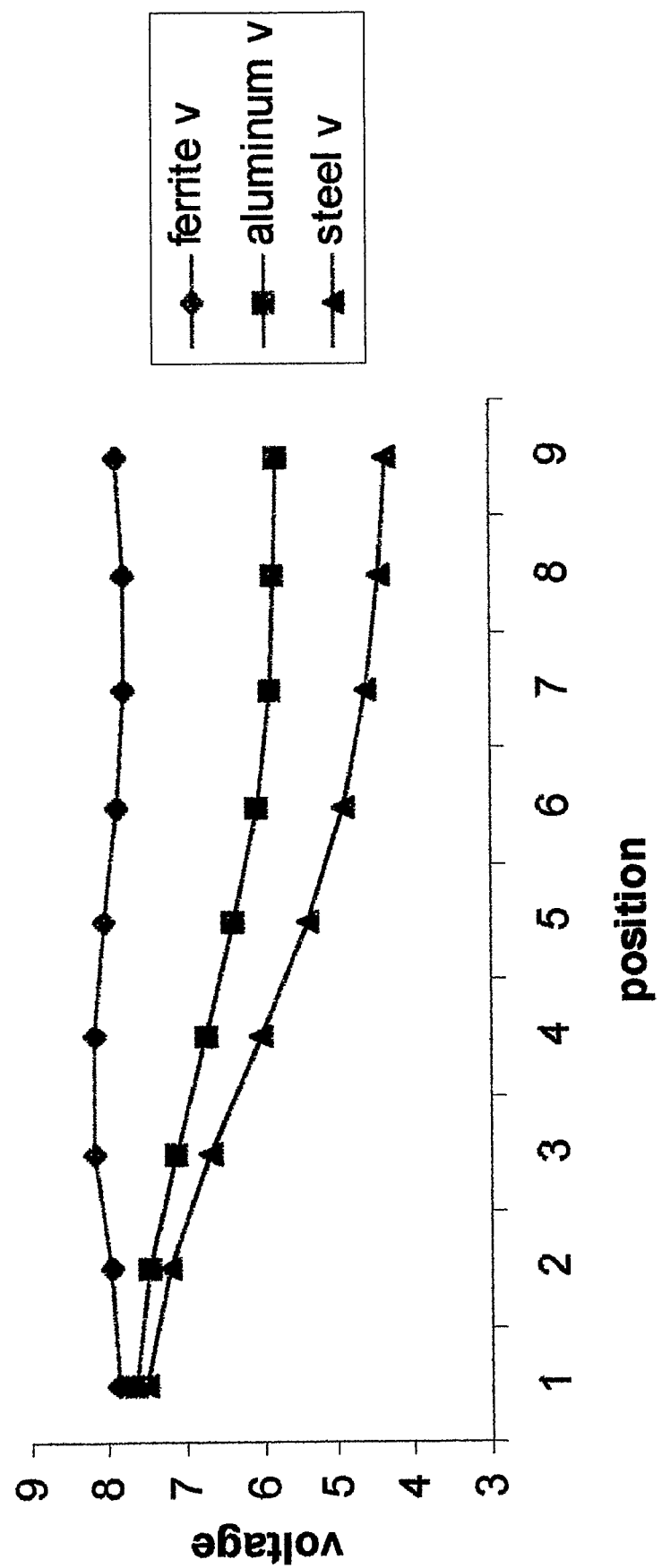
FIG. 27 is a graph of voltage vs. position for different actuator material.

Different actuator materials have different effects on the reactance of inductor L1. Some materials cause a greater change in the period of the output signal than other materials and some materials cause a greater change in the amplitude of the sine wave output signal. There are three categories of materials that find application in this art. FIG. 26 gives data on frequency vs. position for three different materials that exemplify the three categories. The sensor arrangement used to generate the data in FIG. 26 is shown in FIG. 8. The same equipment that generated the date shown in FIG. 26 was used to generate the data shown in FIG. 27. FIG. 27 gives data on voltage vs. position. Soft ferrite represents one category. It is electrically non-conducting magnetic materials. With soft ferrite used to make the actuator, there is a larger change in the frequency of the oscillation and a small change in the amplitude of the oscillation. This large change in frequency makes it usable for high-resolution sensors. Category 2 covers conducting non-magnetic materials like aluminum. Category 2 materials cause less frequency change and more amplitude change than ferrite. Copper plated steel falls into this category. Because category 2 materials cause a good deal of frequency change with sensors of this invention and because they are more easily worked than ferrite there are applications where they are attractive. Category 3 is for magnetic conducting materials like 1018 alloy steel. Category 3 materials cause a small change in the frequency of the oscillation and a large change in the amplitude of the oscillation. Category three materials offer a simple solution for control situations that require voltage input and do not require the resolution that is attainable with frequency-based measurement.

Each of these material categories offers advantages in particular applications. Category 1 materials used with hollow coils as pictured in FIG. 2 offer the highest resolution and best signal to noise ratio when taking frequency as output. Category 2 materials used with FIG. 2 coils give less resolution but simplify manufacturing tasks. Category 3 materials used with FIG. 2 coils and using the voltage output of the circuit of FIG. 3 offer a simple way to get good resolution when voltage output is required.

By using the oscillation frequency as output the circuit can produce better resolution and a better signal to noise ration. This oscillator frequency can be fed to a counter or other device for the determination of output signal. In this way the sensor integrates seamlessly with digital control equipment, and since the circuit has less components a longer mean time before failure (MTBF) is attained. Another advantage of frequency-based measurement is that unlike with voltage-based measurement a fixed ground reference is not needed. This is important with automobiles and aircraft where the power supply is not attached to earth and the ground reference may fluctuate.

Figure 4:
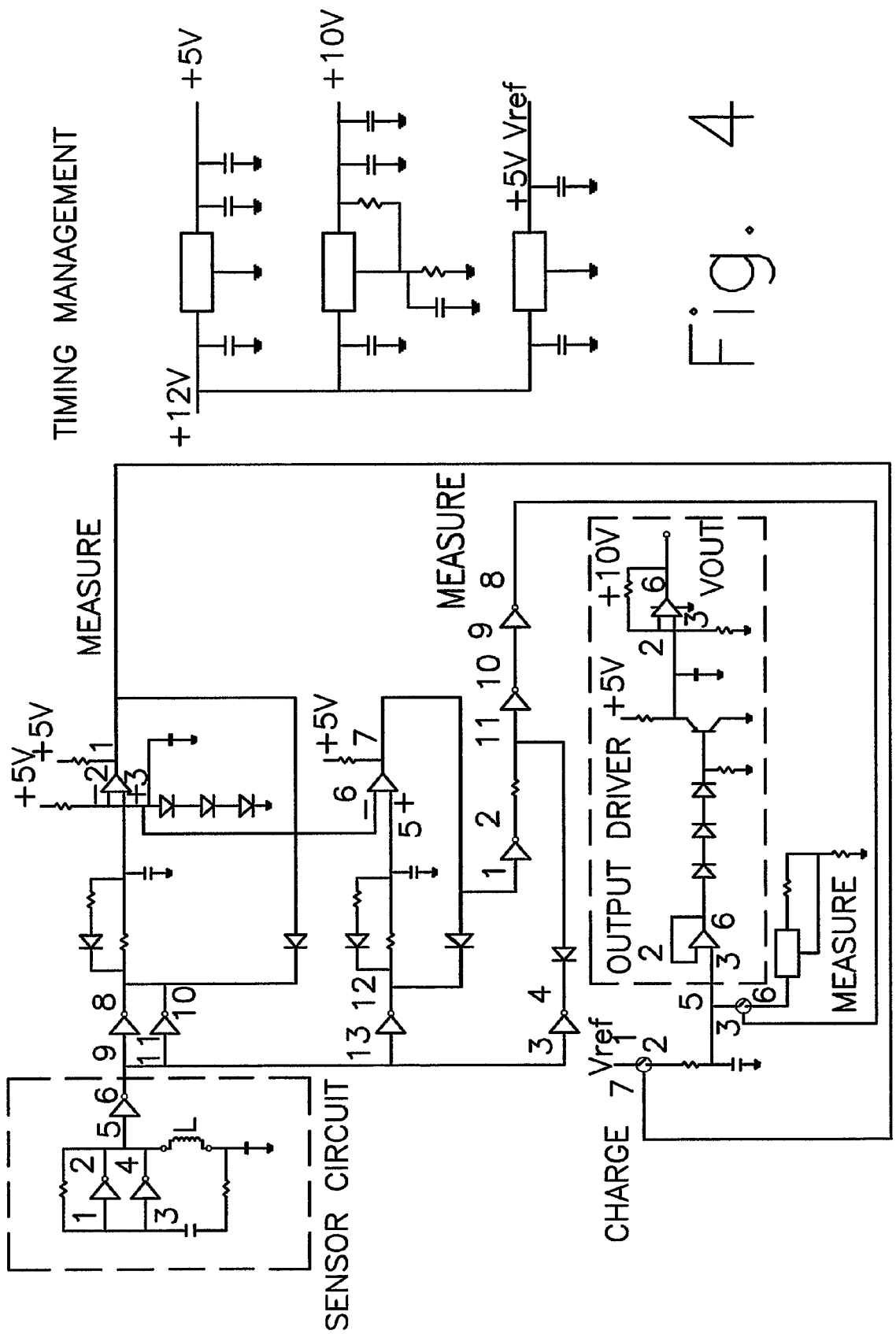
FIG. 4 is a schematic of a circuit that converts the frequency output of the circuit of FIG. 2 into a voltage output.

Some control situations require high resolution and voltage input. FIG. 4 shows a circuit that accomplishes this. The circuit of FIG. 4 encompasses the circuit of FIG. 2 and produces voltage output that is regulated by the frequency of oscillation of the circuit of FIG. 2. The circuit of FIG. 4 converts the frequency output of the oscillator into a voltage that varies with the frequency. With the circuit of FIG. 4 high resolution and high speed are attained.

Circuit Functionality:

The circuit of FIG. 4 processes the signal received from the sensor to an analog output. The output signal is a voltage relative to position with a refresh rate every oscillator cycle. In the process of describing the circuit functionality, the circuit of FIG. 4 is divided into three groups. The groups include the sensor circuit (oscillator circuit of FIG. 2), a timing management circuit and a signal output driver.

Sensor Circuit:

This is the circuit of FIG. 2. The sensor circuit is a closed loop oscillator with a frequency output dependent on position. Output is taken from U2 instead of between L1 and C4. The oscillator frequency is a square wave feeding the timing management circuit.

Time Management Circuit:

The time management circuit subdivides the sensor frequency (period) to make a time measurement per cycle. The first half cycle processes the measurement and the second half cycle is used to update the output signal.

Figure 5:
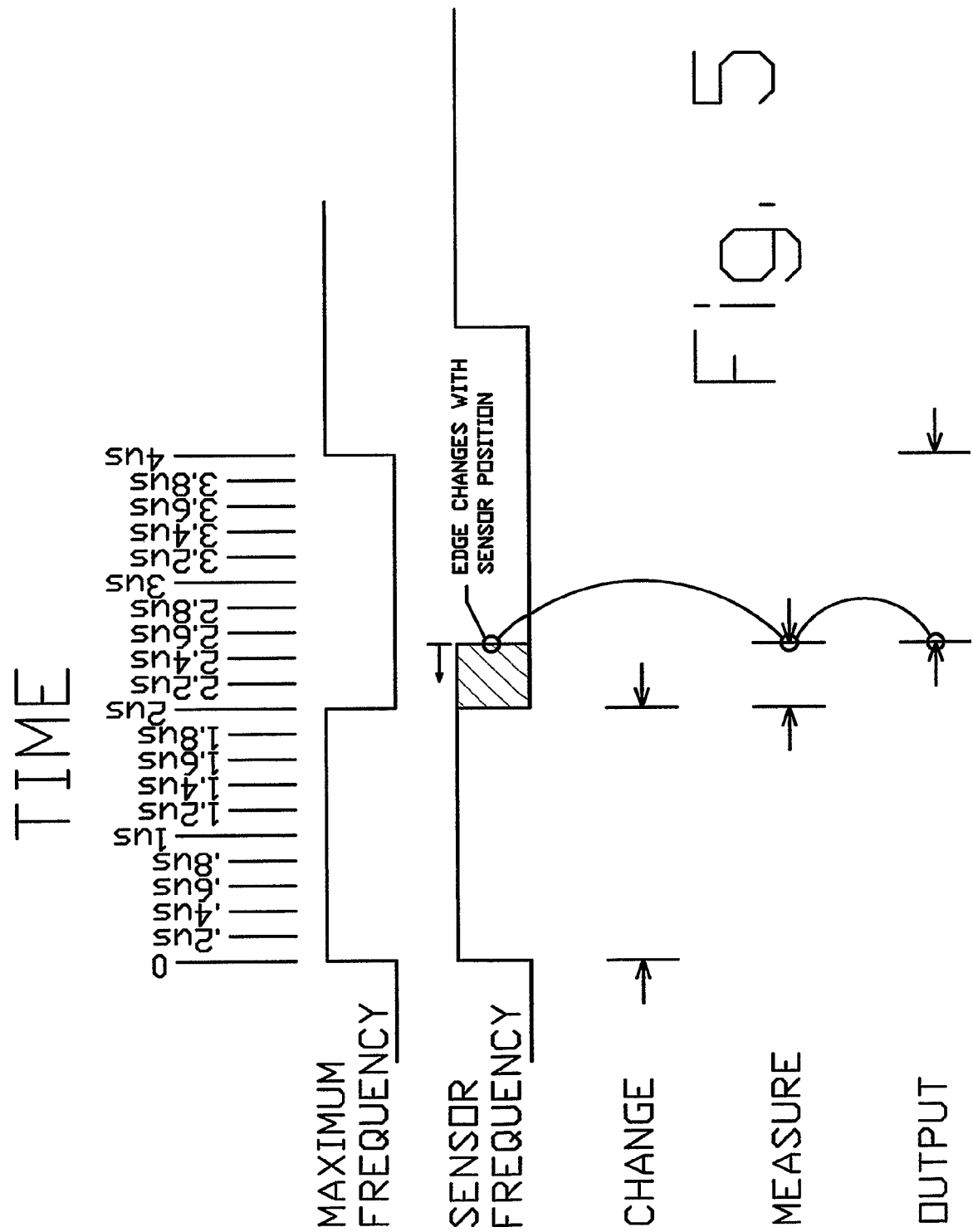
FIG. 5 shows the waveform and is a graphical representation of the timing states used in the circuit of FIG. 4.
Figure 6A:
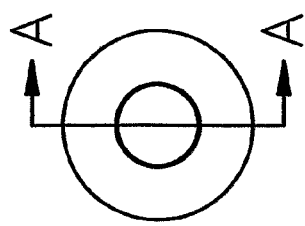
FIG. 6 (6a-e) shows a typical coil—actuator arrangement for detecting linear motion.
Figure 6B:
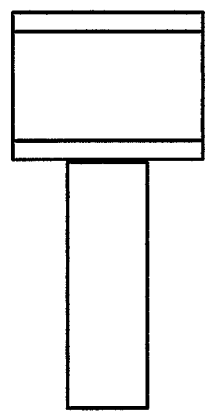
Figure 6C:
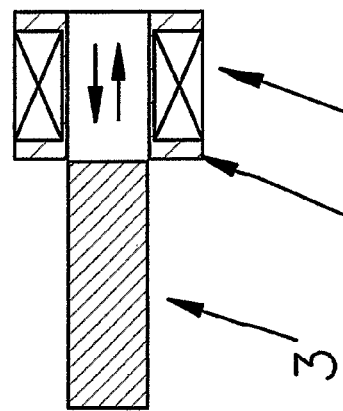
Figure 6D:
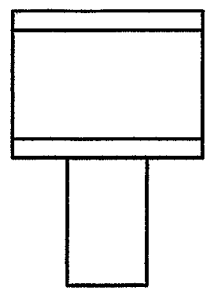
Figure 6E:
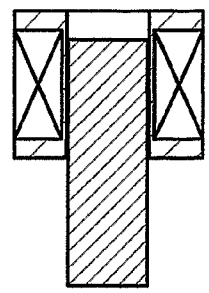

There are two events that occur in the first half cycle, the first is to initialize the time measurement circuit to a preset state and the second is to make the time measurement. The frequency received from the sensor oscillator has an operating window from a minimum frequency to a maximum frequency. The time measurement is the difference from the known maximum frequency (shortest period) to the received sensor frequency. The elapse time from the start of a cycle to the half cycle of the maximum frequency from the sensor is used to charge the timing circuit to a preset state. At the half cycle point of the maximum frequency to the half cycle point of the sensor frequency is the time measurement window. FIG. 5 shows the waveform and is a graphical representation of the timing states.

The time measurement is achieved by a capacitor charged to a reference voltage and discharged at a set rate via a constant current source. Time is a function of voltage on the capacitor.

Signal Output Driver:

The signal output driver provides a voltage output signal referenced to the position of the sensor. The second half cycle of each period received by the sensor oscillator refreshes the output signal. The signal output driver circuit has high input impedance in order to provide minimum loading to the time measurement circuit. A sample and hold circuit makes the measurement at the designated time and holds the value between measurements. An output buffer isolates external circuit loading from the sample and hold circuitry.

Sensors

Figure 9:
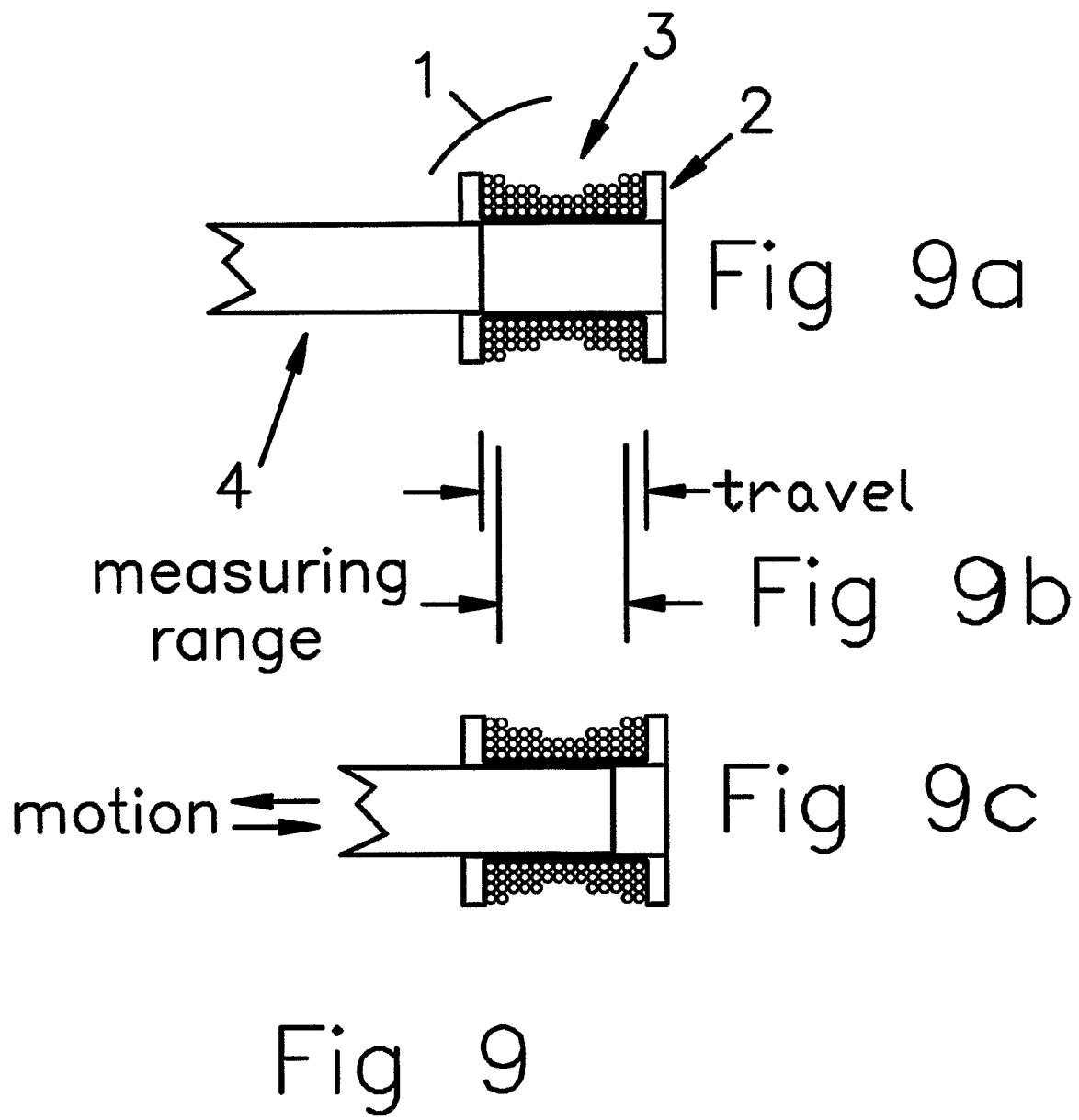
FIG. 9 (9a-c) shows a coil wound for improved linearity of output.
Figure 28:
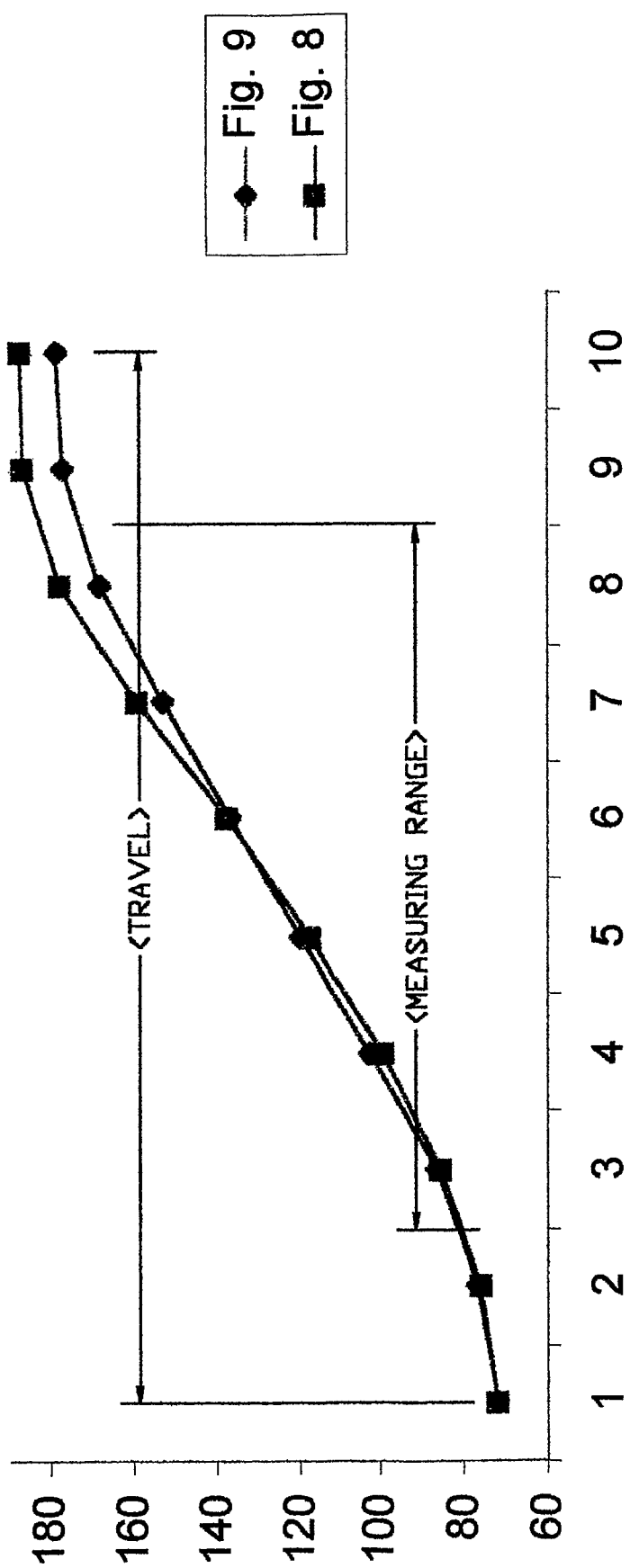
FIG. 28 is a graph of frequency vs. position for various coil-winding techniques.

FIG. 8 shows a coil sensor arrangement for detecting linear motion. In FIG. 8 coil assembly 1 that is comprised of coil of wire 3 wound on bobbin 2. This coil assembly is wound according to the prior art in that the windings are distributed on the bobbin so that there is a consistent number of windings per unit of length of the coil assembly. A coil wound in this way when used as a sensor and with an actuator that has a cylindrical shape will produce an output relationship of position to electrical output that is not linear. FIG. 9 shows a coil assembly that is wound in a different way. By winding the coil so that there are more turns per unit of distance toward the ends of the bobbin the output of the sensor will have a more linear relationship of position to electrical output. FIG. 28 is a graph that depicts the frequency output in kHz vs. position in millimeters of two position sensors, one wound according to the technique of FIG. 8 and one wound according to the technique of FIG. 9. Of the two curves in the graph, the curve for the sensor denoted by FIG. 9 has a curve that is more nearly a straight line in the region denoted as "measuring range". This improved linearity simplifies control logic and makes the output of the sensor more predictable.

Figure 29:
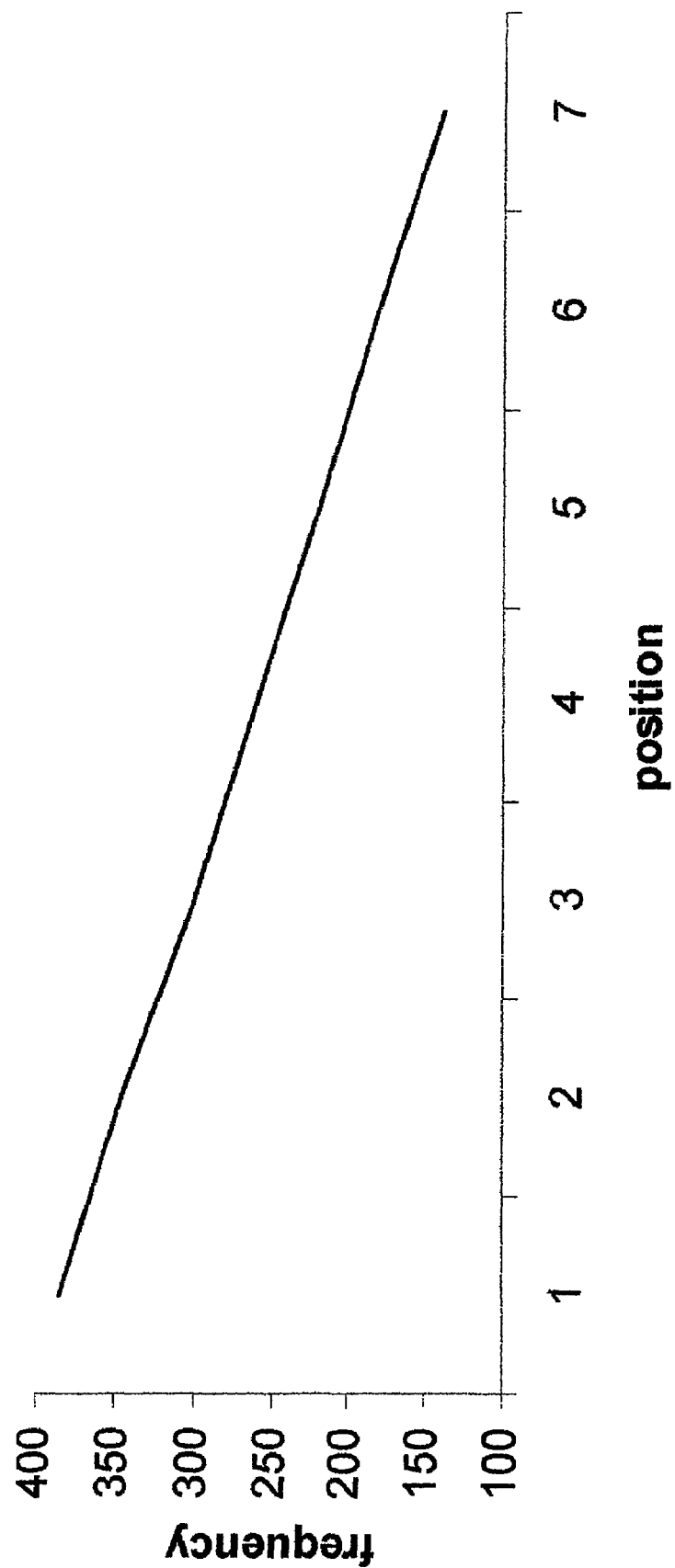
FIG. 29 is a graph of frequency vs. position for a sensor of FIG. 10 design.

FIG. 10 shows a sensor for detecting linear position with high resolution. Coil 1 is wound on bobbin 2. The coil is wound according to the technique of FIG. 9 where the windings are distributed more toward the ends of the bobbin. Shield pieces 4 of which there are two are made of soft ferrite. There may be a different number of shield pieces, the ferrite shield may take the form of a cylinder, or the ferrite may be powdered and the powdered material held in a matrix with an adhesive or held in a cavity around the coil. Housing 5 is made of conducting material as aluminum. The two shield pieces 4 are fixed on the outside of the coil—bobbin assembly that is in turn held in fixed relationship inside of the housing 5. Actuator 3 is made of soft ferrite and is fixed to shaft 7. Actuator 3 moves axially in the space on the inside of the bobbin 2. The actuator—shaft assembly is held by a sleeve bearing (not shown) or by attachment to the body whose position is being detected so that there is no radial displacement between the actuator 3 and the coil 1. Used with the oscillator circuit of the present invention the output is taken in frequency. FIG. 29 shows the output of such a sensor. The sensor used to generate FIG. 29 was made so that the actuator travel is the same as the measuring range, the travel is 0.6 inches and the resolution is 0.00005 inches.

Figure 11:
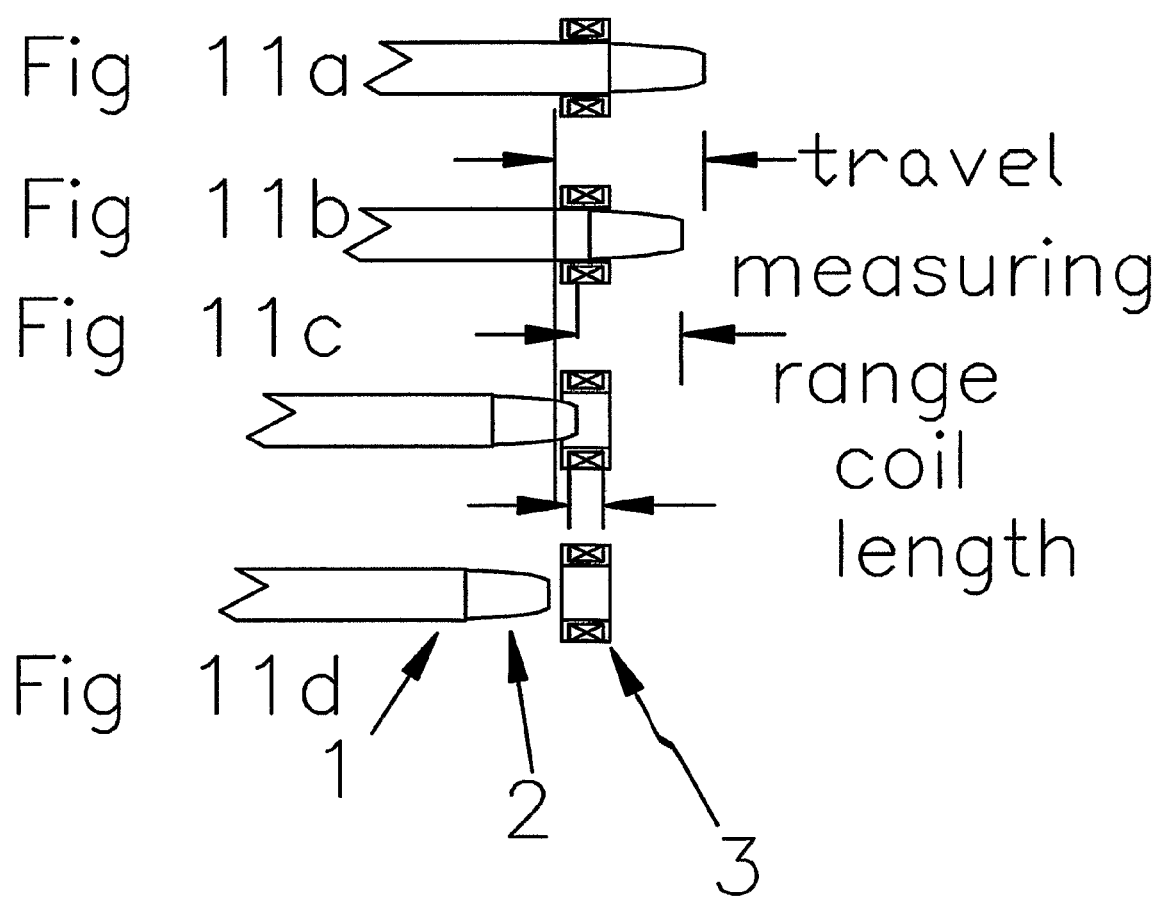
FIG. 11 (11a-d) shows a sensor design with improved linearity.
Figure 30:
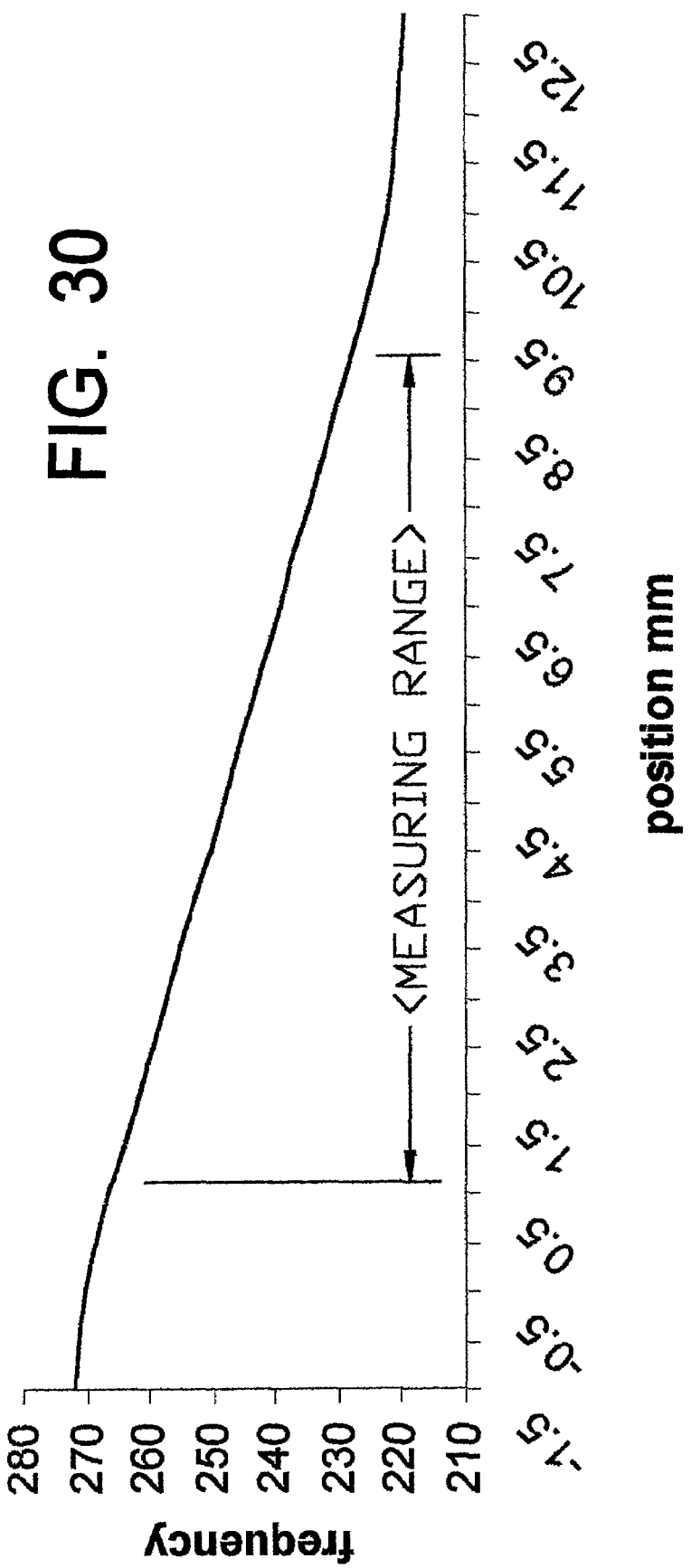
FIG. 30 is a graph of frequency vs. position for a sensor of FIG. 11 design.

There is another way to get linear output from a variable reluctance sensor of the type of FIG. 6 where the actuator moves inside of the coil. By making the coil shorter than the measuring range and by putting a taper on the end of the actuator superior linearity with good resolution can be attained. FIG. 11 shows such a sensor. Actuator 1 has tapered end 2 that moves through coil 3. As more or less of the volume inside of the coil is air space the output of the sensor circuit changes. The tapered end can have a shape made of a number of small steps or it can have a curved shape that is a truncated parabola. The coil in this sensor is wound with uniform cross section as in FIG. 8. A coil geometry and associated taper geometry can be developed that will produce linearity of output better than 1% of the measuring range. Also, the measuring range can be much longer than the coil length. FIG. 30 is a graph of a sensor made according to this technique. The sensor used to generate FIG. 2 has an aluminum actuator. This sensor was designed for use inside of an automobile engine and because of material fatigue considerations a ferrite part was unacceptable. The sensor used to generate FIG. 30 gives resolution of 4 micrometers with a measuring range of 8.5 millimeters.

Figure 12:
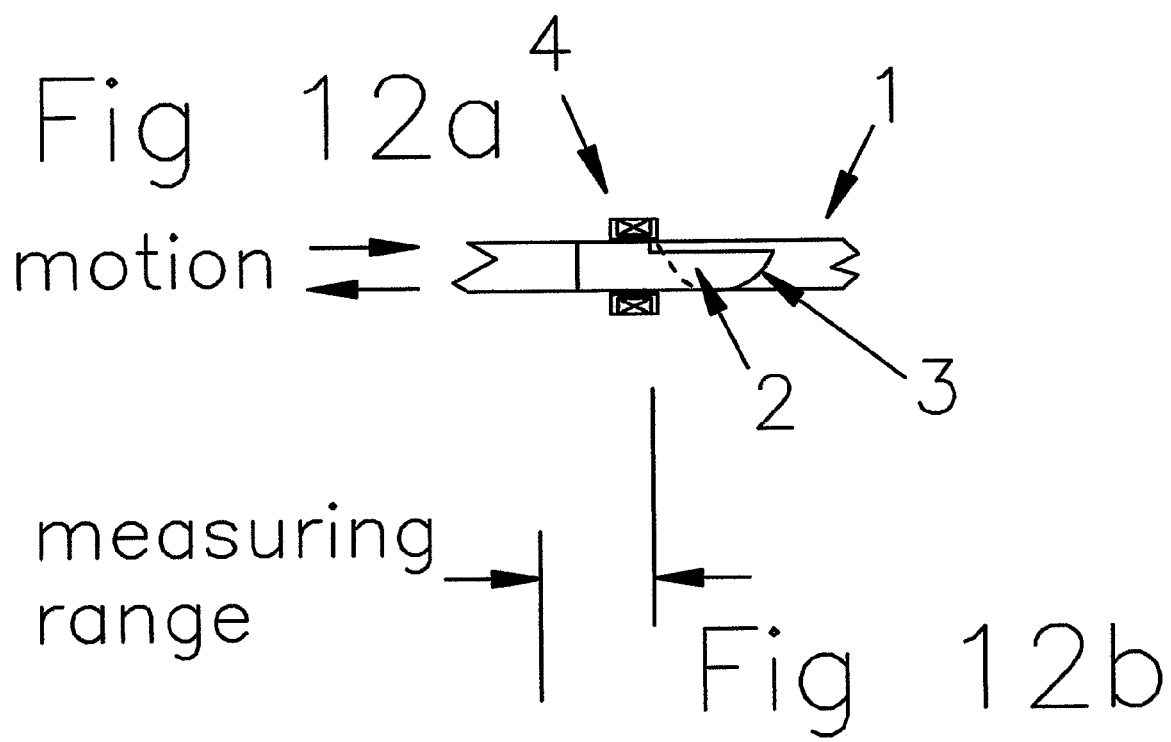
FIG. 12 (12a-c) shows an alternate design of the sensor of FIG. 10.

An alternative design to that of FIG. 11 is shown in FIG. 12. In FIG. 12 steel shaft 1 has copper plated region 2 along its length. The copper plated area has leading edge 3 that is helical or another shape such that as the shaft 1 is moved axially in the coil, relatively more or less of the surface area of the shaft that is inside of the coil is copper plated area. The shape of the copper plated area can be chosen so that a high degree of linearity of output is attained. Also, a long measuring range can be had with differing degrees of resolution.

Figures 13, 13A, 13B, 13C, 13D:
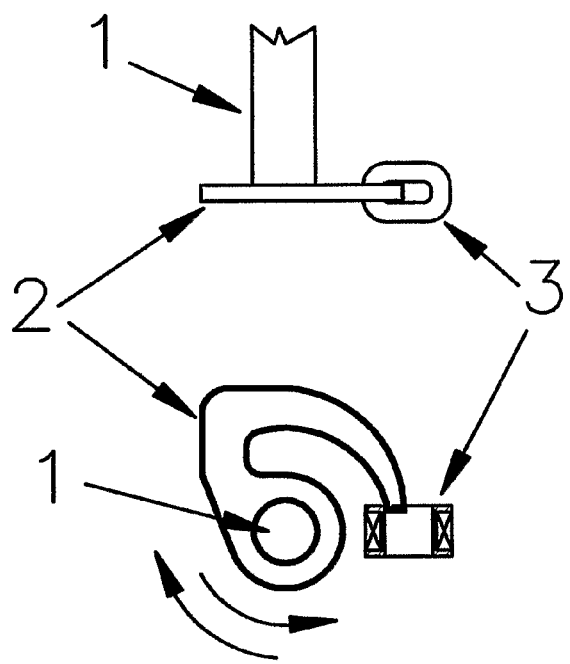
FIG. 13 (13a-d) shows a sensor for detecting angular position.

FIG. 13 shows a sensor for determining angular position. Actuator 2 is rigidly attached to shaft 1. Coil 3 is held in fixed relation to the axis of shaft 1. The actuator may be made of metal and especially aluminum of copper plated steel or it may be made of soft ferrite. The shape of the actuator is chosen so that when the shaft rotates the actuator protrudes into the coil, and more specifically, it is shaped so that the cross section of the actuator material that is in the space inside the coil increases as the shaft is rotated in one direction and decreases as the shaft is rotated in the opposite direction. In this way, the reactance of the coil changes as the shaft is rotated. It is possible to find a shape for the actuator where the output of the circuit is substantially linear with regard to angular position. In FIG. 13 the shaft rotates through an angle of 90 degrees. This is appropriate for use in determining the angular position of a throttle shaft in an automotive throttle body. It is not intended here to limit the use of this type of device to angular displacement of 90 degrees. Other angular displacements can be attained by varying the shape of the actuator 2.

FIG. 14 shows a variation of the sensor type of FIG. 6 for use as an accelerometer. Sensor assembly 6 is comprised of coil 1 that is wound on bobbin 2. The bobbin with coil is rigidly mounted into housing 4. Actuator 3 of known mass is rigidly attached to elastic member 5 of known elasticity. Elastic member 5 may be a spring. Actuator 3 resides inside bobbin 2 and is able to move axially in the bobbin. The end of elastic member 5 that is not attached to the actuator is rigidly attached to the housing 4. The position of the actuator relative to the coil is detected by the circuit of this invention. That position is an indication of a force of acceleration acting on the sensor.

Figure 31:
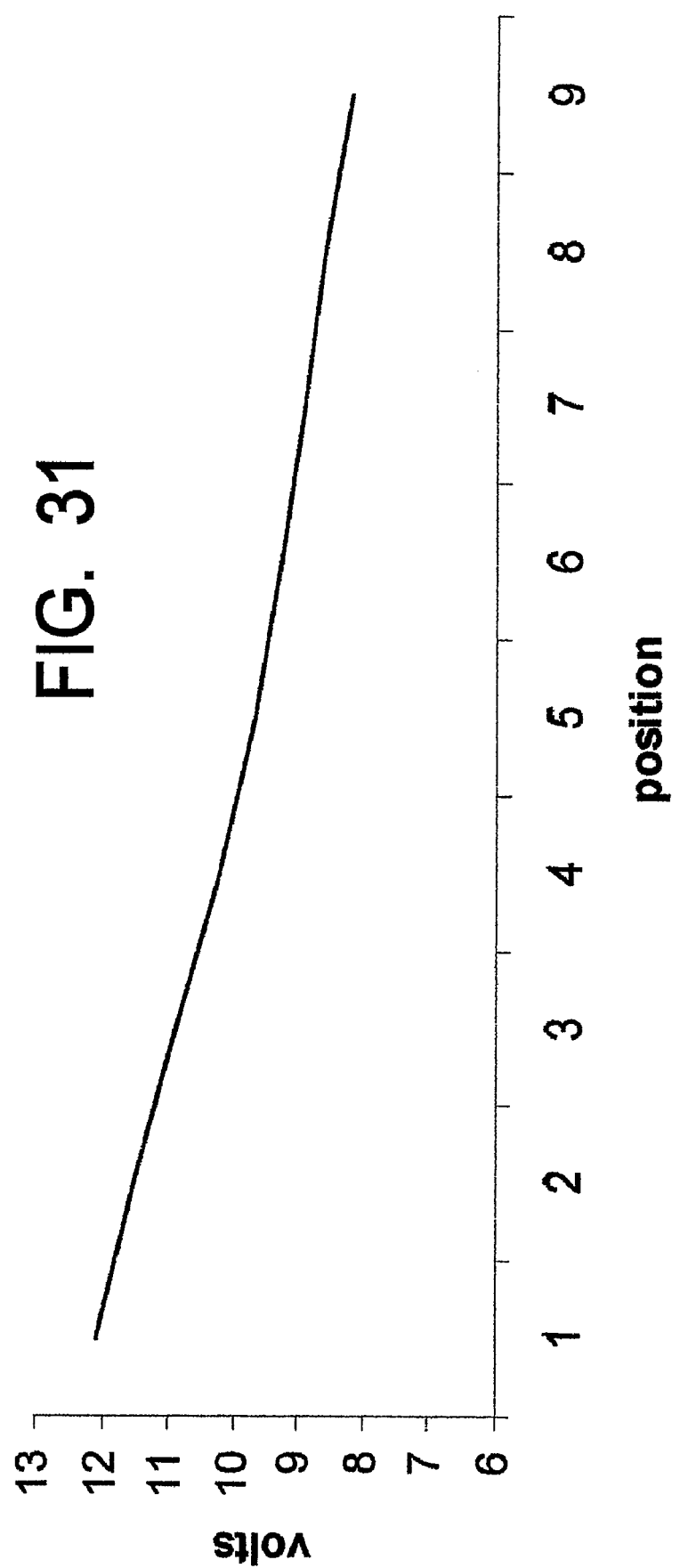
FIG. 31 is a graph of voltage vs. position for a sensor of FIG. 16 design.

FIG. 15 shows a sensor that operates by projecting an electromagnetic field outside of its body. This is similar to the operation of the pot core sensor of FIG. 7. Here coil 2 has an oval shape and resides in ferrite core 1 that has a similar oval shape. The field 4 projected by the sensor of FIG. 15 is elongated along the long axis of the oval as compared to the field projected by the device of FIG. 7. The position of edge 5 of actuator 3 moving in that field in a plane parallel to the axis of the oval can be detected. FIG. 16 shows a modification of the sensor of FIG. 15. The curved ends of the core used in FIG. 15 have been removed. This causes the field projected by the sensor to be more linear in the direction of actuator movement and better linearity of output is attained. FIG. 31 gives output of the sensor of FIG. 16. The actuator was made of 1018 steel to generate this graph.

There are various ways to use the sensor of FIG. 15 or FIG. 16 to detect radial position of a shaft. FIG. 17 shows one such arrangement using a cam. Sensor 1 is held in fixed axial relationship to shaft 4 by mount 2. Shaft 4 is able to rotate in mount 2. Shaft 4 has actuator cam 3 rigidly attached to it. Rotation of shaft 4 causes the edge of its actuator to move across the face of sensor 1 causing the output of the sensor circuit to change. In this way radial position of the shaft is determined. Various actuator shapes will cause the circuit output vs. radial position of the shaft to have different characteristics. FIG. 18 shows one variation.

Figure 20:
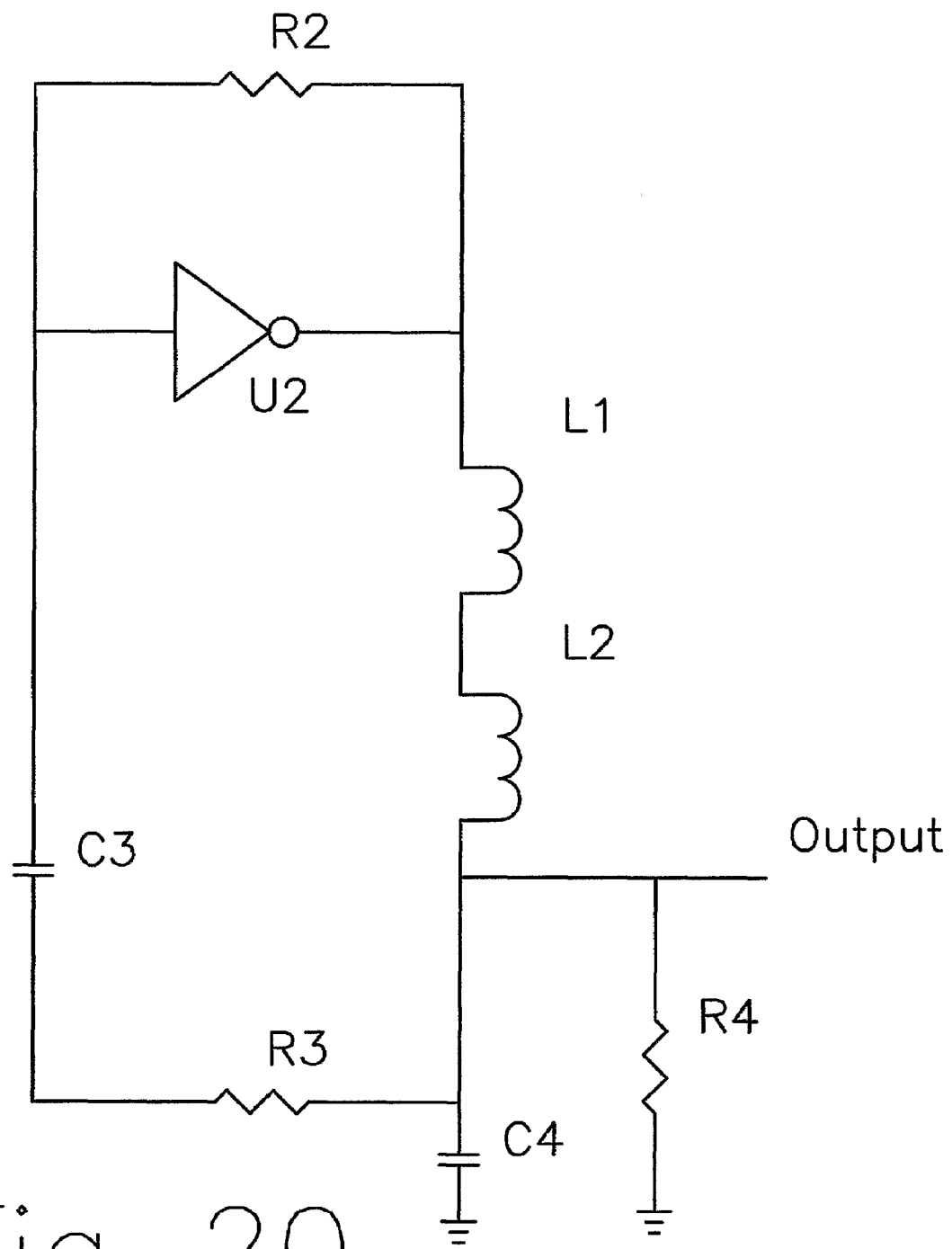
FIG. 20 shows a circuit for use with the sensor arrangement of FIG. 19.
Figure 21:
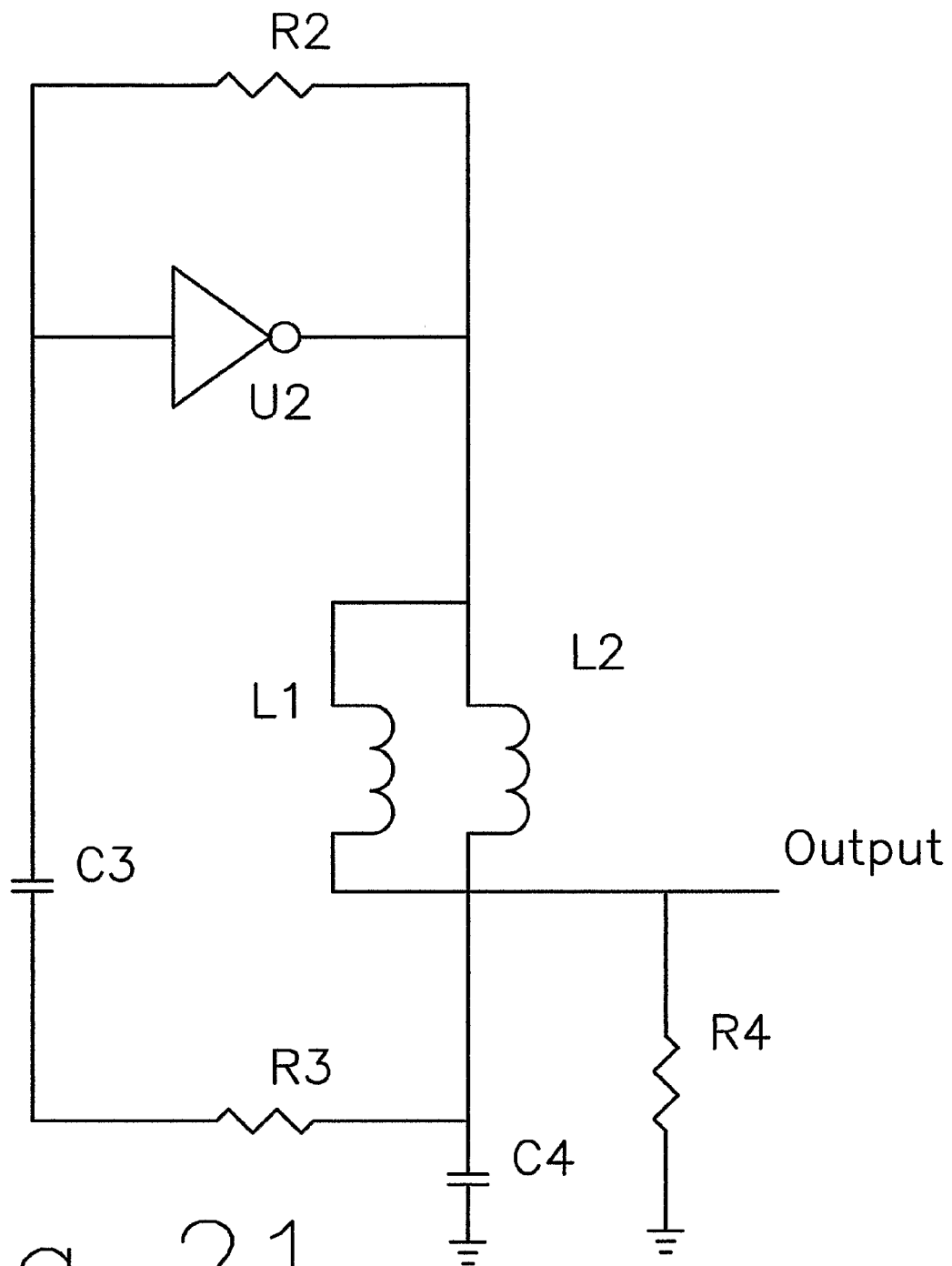
FIG. 21 shows an alternate circuit to the one shown in FIG. 20.

The sensors of FIG. 15 and FIG. 16 are sensitive to motion of the actuator in a direction perpendicular to the face of the sensor. In the sensor arrangements of FIG. 17 or FIG. 18 axial motion of the shaft—actuator assembly way cause unwanted inaccuracy. FIG. 19 shows a sensor arrangement that compensates for axial movement of the shaft actuator assembly. Sensor 5 is added to the arrangement and is positioned so that the faces of the two sensors are opposed to each other and the actuator is located midway between them. FIG. 20 and FIG. 21 show how the sensors can be wired to compensate for axial motion of the shaft actuator assembly. Sensor 1 of FIG. 19 corresponds to L1 of FIG. 20 and FIG. 21. Sensor 5 is L2 of FIG. 20 and FIG. 21. The two sensor arrangement can be wired with the inductors in series as in FIG. 20 or in parallel as in FIG. 21. Either variation adds axial motion compensation with little added complexity. The two circuit variations shown in FIG. 20 and FIG. 21 are functionally the same as the circuit of FIG. 2 and are variations on the sensor oscillator circuit used throughout this invention.

FIG. 22 shows another way for detecting radial position of a shaft. In FIG. 22 sensor 1 is held in fixed axial relation to shaft 2. Shaft 2 has end 3 that is cut on a bias or is a sinusoidal shape so that when shaft 3 rotates there is more or less of the radial surface of the shaft in conjunction with the face of the sensor. The sensor detects the position of the edge 3 with relation to the sensor's length. The shaft may be a metal or ferrite. FIG. 23 shows a variation to the sensor arrangement of FIG. 22. In FIG. 23 shaft 3, which is now made of magnetic steel, does not have a truncated end that interacts with the sensor 1. Instead copper plated area 4 has edge 3 that corresponds with edge 3 in FIG. 21. The sensor 1 detects the relative position of the edge 3 with regard to the sensor's length.

Figure 24:
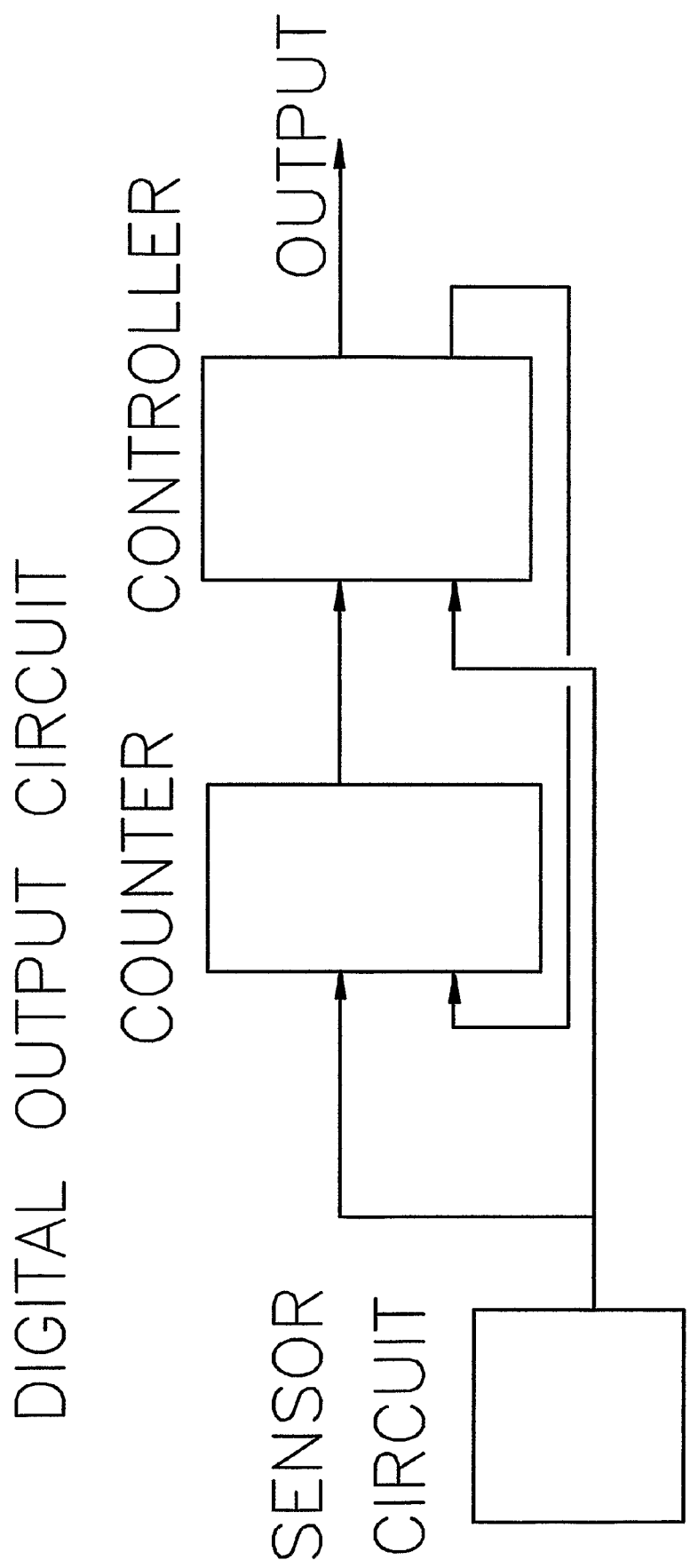
FIG. 24 shows a block diagram of a circuit for deriving digital output from the circuit of FIG. 2 with a low output signal refresh rate.

FIG. 24 is a block diagram of a circuit for digital output from the circuit of FIG. 2. In the block diagram the block marked sensor is the circuit of FIG. 2. The sensor has a frequency output dependent on the position of the sensor actuator. The sensor frequency is the input to the counter. The position sensor also sources a timing status to the controller. The counter window is determined by the controller's onboard clock. The counter records the oscillator clock for a given window. At the completion of a count window the controller stops the clock to the counter. The controller receives status that a count window is complete. The controller reads the counter, resets the count for the next cycle and provides an output dependent on the count data.

Figure 25:
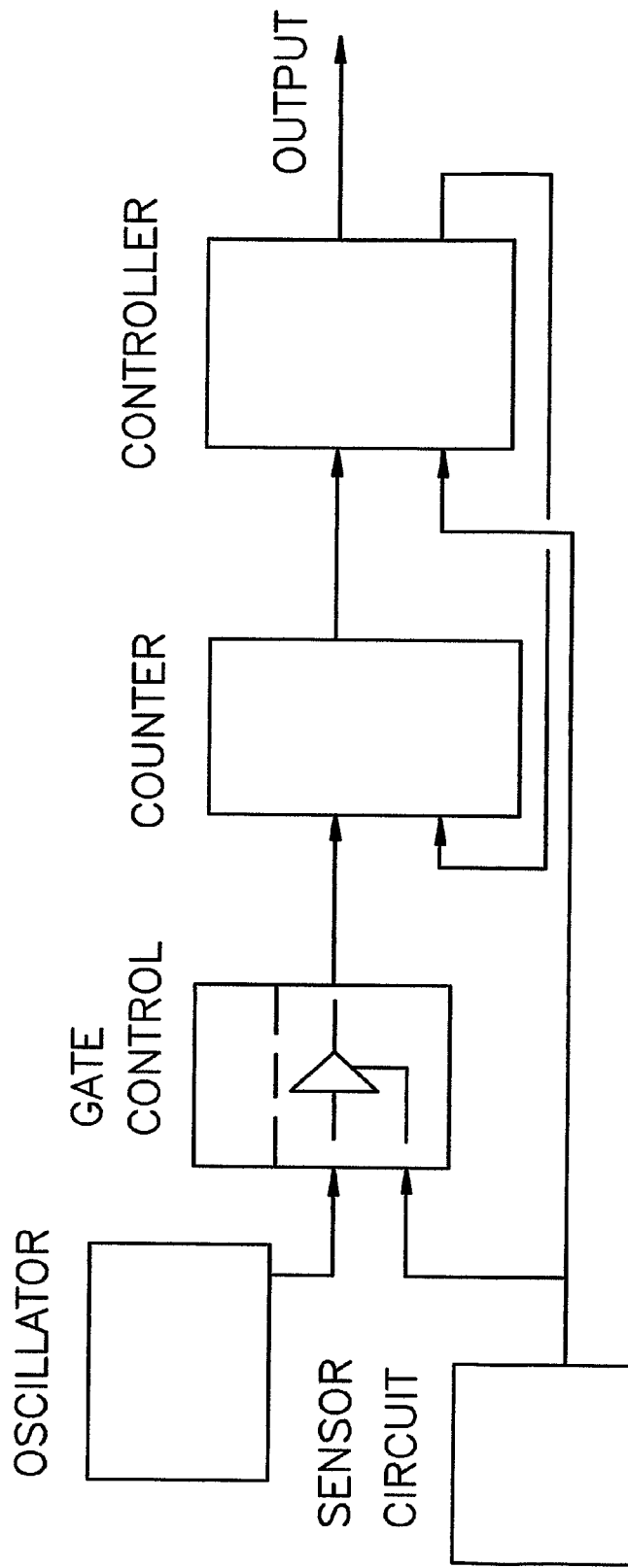
FIG. 25 shows a block diagram of a circuit for deriving digital output from the circuit of FIG. 2 with a high output signal refresh rate.

FIG. 25 is another block diagram of a circuit for digital output from the circuit of FIG. 2. The circuit of FIG. 25 is for applications that require a high frequency input signal refresh rate. The refresh rate of this circuit is equal to the sensor oscillator frequency, which can be on the order of 500 kHz. In the block diagram the block marked sensor is the circuit of FIG. 2. The oscillator is a free running oscillator of high frequency relative to the position sensor oscillator. The free running oscillator sources the input to the gate control logic. The sensor has a frequency output dependent on the position of the sensor actuator. The sensor sources the enable function to the gate control logic. The gate control passes the oscillator clock to the counter when the enable function is true. The position sensor also sources a timing status to the controller. The counter records the oscillator clock for a given window. The window is determined by the position sensor frequency. At the completion of a count window the gate control logic stops the clock to the counter. The controller receives status that a count window is complete. The controller reads the counter, resets the count for the next cycle and provides an output dependent on the count data.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

1. A position sensor circuit for determining the position of an actuator, the circuit comprising:
   an oscillator circuit comprising:
   a variable inductor; and
   a capacitor;
   said variable inductor being separated from ground by the capacitor;
and wherein output of the oscillator circuit is used to indicate relative position of the actuator relative to the inductor.

2. The position sensor circuit of claim 1 wherein the variable inductor is in series with the capacitor.

3. The position sensor circuit of claim 1 further comprising:
   another capacitor; and
   an amplifier;
wherein said another capacitor being located in a feedback path from the connection between said variable inductor and said capacitor to said amplifier.

4. The position sensor circuit of claim 3 wherein said another capacitor is capable of blocking DC current.

5. The position sensor circuit of claim 1 wherein output is provided as an oscillatory signal having a frequency.

6. The position sensor circuit of claim 5 wherein said frequency is comprised in a sine wave oscillator output; and wherein said sine wave oscillator output is rectified to a DC signal.

7. The position sensor circuit of claim 3 further comprising a component capable of providing a square wave output, said component receiving, as input, an output signal from said amplifier.

8. The position sensor circuit of claim 3 wherein a signal from the amplifier is provided to a frequency to voltage conversion circuit.

9. The position sensor circuit of claim 1 wherein output is provided as a signal selected from the group consisting of a sine wave, a square wave and a DC signal.

10. The position sensor circuit of claim 7 further comprising a component capable of providing a time measurement, said time measurement being obtained from a predetermined value and said square wave output.

11. The position sensor circuit of claim 1 wherein said variable inductor comprises a coil and an actuator; and wherein a spatial relationship between said actuator and said coil determines a reactance.

12. The position sensor circuit of claim 11 wherein said actuator comprises a soft ferrite material.

13. The position sensor circuit of claim 11 wherein said coil comprises a ferrite shield.

14. The position sensor circuit of claim 11 wherein a density of windings of said coil substantially at each end of the coil is higher a density of windings of said coil substantially at a center of said coil.

15. The position sensor circuit of claim 11 wherein said coil is shorter than a measuring range; and wherein said actuator comprises a tapered end.

16. The position sensor circuit of claim 11 wherein said coil is shorter than a measuring range; and the actuator is a copper region on a midpoint of a steel shaft; wherein that region has a leading edge which is helical.

17. The position sensor circuit of claim 11 wherein said coil is shorter than a measuring range; and the actuator is a copper region on a midpoint of a steel shaft, wherein that region has a leading edge which is pointed.

18. The position sensor circuit of claim 11 wherein the actuator has a substantially spiral shape and the coil is shorter than the radial stroke of the actuator;
whereby angular position can be detected.

19. The position sensor circuit of claim 11 wherein the actuator held in position by a substantially elastic support; whereby acceleration can be detected.

20. The position sensor circuit of claim 11 wherein the core comprises a magnetic material; and wherein said magnetic material has a substantially E shaped cross section; and wherein said substantially E shape has a thickness greater than zero;
whereby a proximity sensor is obtained.

21. The position sensor circuit of claim 11 wherein said coil is shorter than a measuring range; and wherein said actuator comprises a cam shaped actuator;
whereby radial position can be detected:

22. The position sensor circuit of claim 15 further comprising:
another oscillator circuit comprising:
another variable inductor; and
another capacitor;
said another variable inductor being separated from ground by said another capacitor;
wherein said another variable inductor comprises another coil and another actuator; and
wherein a spatial relationship between said another actuator and said another coil determines another inductance;
wherein said another coil is shorter than a measuring range;
wherein said another actuator comprises a tapered end; and
wherein said coil and said another coil are wired in series.

23. The position sensor circuit of claim 22 wherein said coil and said another coil face each other; and wherein said actuator and said another actuator comprise with a same cam shaped actuator between said coil and said another coil.

24. The position sensor circuit of claim 11 wherein said coil is shorter than a measuring range; and wherein said actuator comprises a cam shaped actuator;
whereby radial position can be detected.

25. The position sensor circuit of claim 15 further comprising:
another oscillator circuit comprising:
another variable inductor; and
another capacitor;
said another variable inductor being separated from ground by said another capacitor;
wherein said another variable inductor comprises another coil and another actuator; and
wherein a spatial relationship between said another actuator and said another coil determines another inductance;
wherein said another coil is shorter than a measuring range;
wherein said another actuator comprises a tapered end; and
wherein said coil and said another coil are wired in parallel.

26. The position sensor circuit of claim 22 wherein said coil and said another coil face each other; and wherein said actuator and said another actuator comprise with a same cam shaped actuator between said coil and said another coil.

27. The position sensor circuit of claim 15 wherein said actuator comprises a metal shaft having a bias cut; whereby a radial position of the metal shaft can be detected.

28. The position sensor circuit of claim 15 wherein said actuator comprises a magnetic steel shaft having a copper coated section; and wherein said copper coated section comprises an edge forming a helix.

29. The position sensor circuit of claim 15 wherein said actuator comprises a magnetic steel shaft having a copper coated section; and wherein said copper coated section comprises an edge forming a pointed shape.

30. The position sensor circuit of claim 7 further comprising:
a counter receiving the square wave output as input; and
a controller, wherein an on-board clock of said controller sets a count window in said counter;
and wherein said counter counts cycles of the oscillatory signal, and where in the counted cycles are used to create output.

31. The position sensor circuit of claim 7 further comprising:
a gate controller,
wherein a frequency of the square wave output is used to set a gate duration of said gate controller;
a free running oscillator of frequency higher than the frequency of the square wave output; and
a digital output circuit capable of counting cycles of said free running oscillator; wherein the counted cycles are used to create output.

* * * * *